(12) United States Patent
Horiuchi et al.

(10) Patent No.: US 12,334,033 B2
(45) Date of Patent: Jun. 17, 2025

(54) ACTIVE MATRIX SUBSTRATE AND DISPLAY DEVICE

(71) Applicant: Sharp Display Technology Corporation, Kameyama (JP)

(72) Inventors: Satoshi Horiuchi, Kameyama (JP); Akane Sugisaka, Kameyama (JP); Seiya Kawamorita, Kameyama (JP); Shinji Matsubara, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 184 days.

(21) Appl. No.: 18/236,906

(22) Filed: Aug. 22, 2023

(65) Prior Publication Data

US 2024/0105139 A1 Mar. 28, 2024

(30) Foreign Application Priority Data

Sep. 22, 2022 (JP) .................................. 2022-151995

(51) Int. Cl.
*G09G 3/36* (2006.01)
*G02F 1/1362* (2006.01)
*G02F 1/1368* (2006.01)

(52) U.S. Cl.
CPC ..... *G09G 3/3677* (2013.01); *G02F 1/136286* (2013.01); *G02F 1/1368* (2013.01); *G09G 2310/08* (2013.01)

(58) Field of Classification Search
CPC .... G09G 3/3677; G09G 2310/08; G09G 3/20; G09G 3/3648; G09G 2300/0408; G09G 2300/0426; G09G 3/006; G02F 1/136286; G02F 1/1368
See application file for complete search history.

(56) References Cited

U.S. PATENT DOCUMENTS

| | | |
|---|---|---|
| 2003/0063080 A1 | 4/2003 | Takahashi et al. |
| 2005/0200797 A1 | 9/2005 | Shiota et al. |
| 2006/0203138 A1 | 9/2006 | Chen et al. |
| 2009/0315840 A1* | 12/2009 | Park ...................... G06F 3/0412 345/173 |
| 2013/0265513 A1 | 10/2013 | Ogasawara et al. |
| 2015/0194121 A1* | 7/2015 | Lee ...................... G09G 3/3677 345/212 |
| 2018/0114495 A1* | 4/2018 | Jung ..................... G09G 3/3607 |
| 2018/0322844 A1* | 11/2018 | Lee .......................... G09G 5/10 |
| 2019/0027090 A1 | 1/2019 | Nonaka et al. |

(Continued)

FOREIGN PATENT DOCUMENTS

| | | |
|---|---|---|
| JP | 2003-108021 A | 4/2003 |
| JP | 2003-271067 A | 9/2003 |
| JP | 2005-301239 A | 10/2005 |

(Continued)

*Primary Examiner* — Pegeman Karimi
(74) *Attorney, Agent, or Firm* — ScienBiziP, P.C.

(57) ABSTRACT

Provided is a display device including gate drive circuits, a signal line connected to the gate drive circuit, a signal line connected to the gate drive circuit, a gate terminal, inspection terminals, and a connection line. The connection line connects the signal line and the signal line. The inspection terminal is disposed on the signal line. The inspection terminal is disposed on the signal line. The inspection terminals are terminals input with an inspection signal at the time of inspection.

19 Claims, 21 Drawing Sheets

(56) References Cited

U.S. PATENT DOCUMENTS

2019/0057648 A1* 2/2019 Xu .................. G09G 3/3275
2019/0319046 A1 10/2019 Tominaga et al.

FOREIGN PATENT DOCUMENTS

| JP | 2007-241028 A | 9/2007 |
| JP | 2014-178407 A | 9/2014 |
| JP | 2019-184938 A | 10/2019 |
| JP | 2021-047336 A | 3/2021 |
| WO | 2012/090817 A1 | 7/2012 |

* cited by examiner

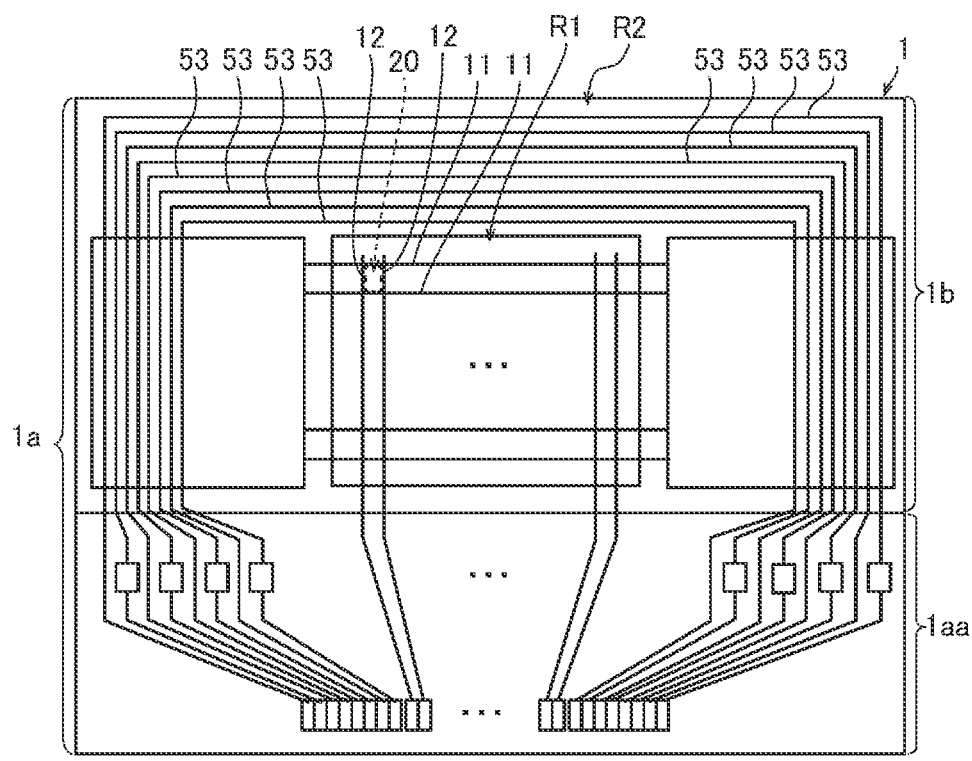
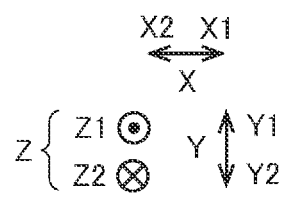
FIG. 1B

| | INSPECTION TERMINAL | SIGNAL WAVEFORM |
|---|---|---|
| DRIVE | FIRST CK1 INSPECTION TERMINAL | CK1 SIGNAL |
| | FIRST CK2 INSPECTION TERMINAL | CK2 SIGNAL |
| | FIRST CK3 INSPECTION TERMINAL | CK3 SIGNAL |
| | FIRST CK4 INSPECTION TERMINAL | CK4 SIGNAL |
| | FIRST VDD INSPECTION TERMINAL | VDD SIGNAL |
| | GSP INSPECTION TERMINAL | GSP SIGNAL |
| | CLR INSPECTION TERMINAL | CLR SIGNAL |
| | VSS INSPECTION TERMINAL | VSS SIGNAL |
| FLOATING | SECOND CK1 INSPECTION TERMINAL | VSS SIGNAL |
| | SECOND CK2 INSPECTION TERMINAL | VSS SIGNAL |
| | SECOND CK3 INSPECTION TERMINAL | VSS SIGNAL |
| | SECOND CK4 INSPECTION TERMINAL | VSS SIGNAL |
| | SECOND VDD INSPECTION TERMINAL | VSS SIGNAL |
| | GSP INSPECTION TERMINAL | GSP SIGNAL |
| | CLR INSPECTION TERMINAL | CLR SIGNAL |
| | VSS INSPECTION TERMINAL | VSS SIGNAL |

FIG. 11

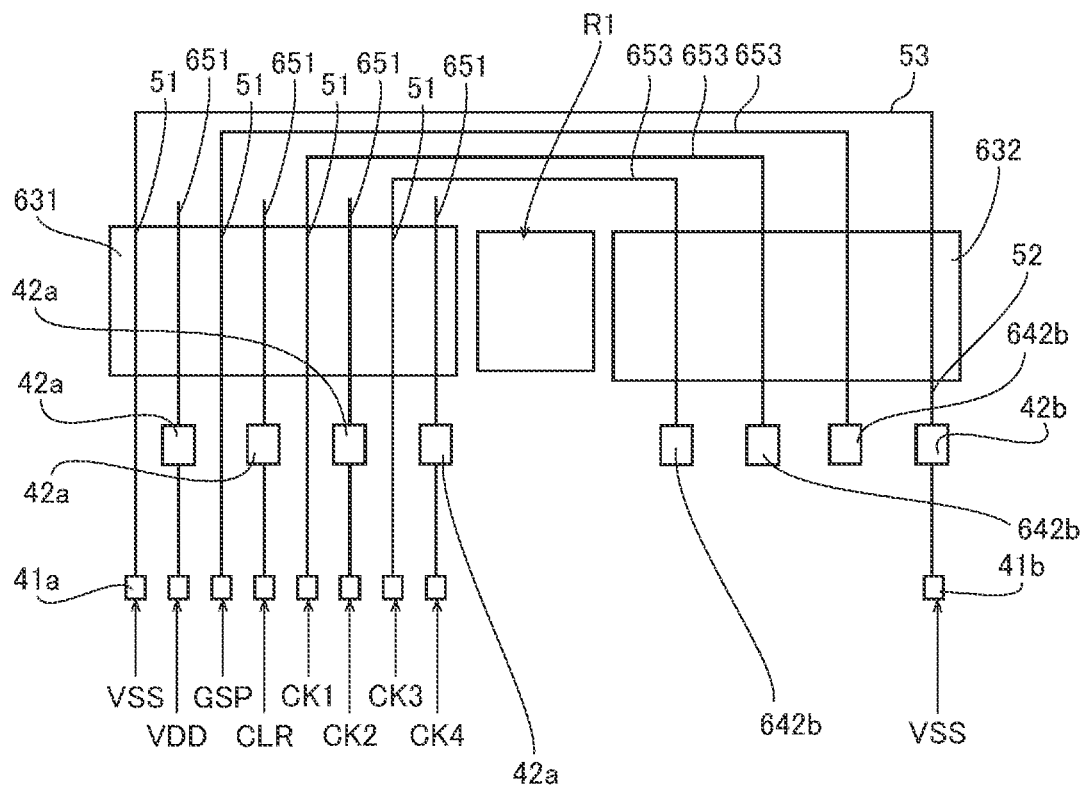
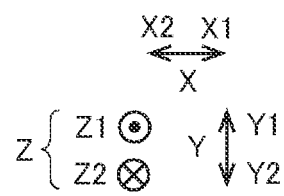
FIG. 15

ACTIVE MATRIX SUBSTRATE AND DISPLAY DEVICE

CROSS-REFERENCE TO RELATED APPLICATIONS

This application claims the benefit of priority to Japanese Patent Application Number 2022-151995 filed on Sep. 22, 2022. The entire contents of the above-identified application are hereby incorporated by reference.

BACKGROUND

Technical Field

The disclosure relates to an active matrix substrate and a display device.

A known display device includes an active matrix substrate. For example, such a display device is disclosed in JP 2007-241028 A.

The display device described in JP 2007-241028 includes two gate drivers disposed on a substrate and a control circuit. On the substrate, a gate terminal is disposed at a position close to one of the two gate drivers. The control circuit supplies a control signal to one of the two gate drivers via the gate terminal. In addition, the control signal reaches the other gate driver via a wiring line running from one gate driver to the other gate driver.

SUMMARY

In the display device described in JP 2007-241028 A, when the control signal passes through the wiring line running from one gate driver to the other gate driver, the point in time at which the control signal reaches the on potential of the thin film transistor is later than it should be (waveform is blunted). Thus, the thin film transistor does not operate at the appropriate timing, and the quality of the display by the pixel is degraded.

In order to improve the display quality, two gate terminals and two signal lines respectively connecting the two gate terminals to two gate drivers may be provided on an active matrix substrate. Then, control signals from the two gate terminals may be supplied to the two gate drivers. However, with this active matrix substrate, the number of gate terminals is twice that in the above-mentioned JP 2007-241028 A. Also, on the active matrix substrate, separate from the gate terminals, input terminals used for inspecting the active matrix substrate or the display device are provided. Since the number of input terminals provided is the same as the number of gate terminals, on the active matrix substrate, the number of input terminals is twice that of the input terminals in the above-mentioned JP 2007-241028 A. As the number of gate terminals and input terminals increases, the dimensions of the frame region of the substrate increase. When input terminals are not provided and the gate terminals are used as input terminals (for example, inspection terminals), to bring an inspection electrode appropriately into contact with a target gate terminal, a large area is needed. Furthermore, there is concern that the gate terminal may be damaged by the inspection electrode.

Thus, the disclosure has been conceived in order to solve the problems described above and aims to provide an active matrix substrate and a display device that can improve display quality and reduce the number of terminals disposed on a substrate.

To solve the problems described above, an active matrix substrate according to a first aspect of the disclosure includes: a substrate; a plurality of thin film transistors formed in a pixel region of the substrate; a gate line group including a plurality of gate lines respectively connected to the plurality of thin film transistors; a first gate drive circuit configured to supply a gate signal to the gate line group from a first direction; a second gate drive circuit configured to supply a gate signal to the gate line group from a second direction opposite the first direction; a first control signal line connected to the first gate drive circuit; a second control signal line connected to the second gate drive circuit; a first gate terminal connected to the first control signal line, the first gate terminal configured to supply a control signal to the first control signal line; a second gate terminal connected to the second control signal line, the second gate terminal configured to supply a control signal to the second control signal line; a first connection line configured to connect the first control signal line and the second control signal line; and a first input terminal disposed on one of the first control signal line, the second control signal line, and the first connection line.

A display device according to a second aspect of the disclosure includes: a substrate; a plurality of thin film transistors formed in a pixel region of the substrate; a gate line group including a plurality of gate lines respectively connected to the plurality of thin film transistors; a first gate drive circuit configured to supply a gate signal to the gate line group from a first direction; a second gate drive circuit configured to supply a gate signal to the gate line group from a second direction opposite the first direction; a first control signal line connected to the first gate drive circuit; a second control signal line connected to the second gate drive circuit; a first gate terminal connected to the first control signal line, the first gate terminal configured to supply a control signal to the first control signal line; a second gate terminal connected to the second control signal line, the second gate terminal configured to supply a control signal to the second control signal line; a first connection line configured to connect the first control signal line and the second control signal line; a first input terminal disposed on one of the first control signal line, the second control signal line, and the first connection line; and a counter substrate disposed opposite the substrate.

In the configuration described above, a control signal is supplied from the first gate terminal to the first gate drive circuit, and a control signal is supplied from the second gate terminal to the second gate drive circuit. Accordingly, unlike when the control signals pass through the wiring line formed running between the first gate drive circuit and the second gate drive circuit from one to the other, the control signals supplied to the first gate drive circuit and the second gate drive circuit are unlikely to have a blunted waveform. As a result, the thin film transistor can be operated at the appropriate timing, allowing the display quality to be improved. Also, since the first input terminal is disposed on one of the first control signal line, the second control signal line, and the first connection line, a signal input from the first input terminal is supplied to both the first gate drive circuit and the second gate drive circuit. Accordingly, the number of terminals can be made less compared to a configuration without the first connection line in which the first input terminal is provided for each of the first control signal line and the second control signal line.

BRIEF DESCRIPTION OF DRAWINGS

The disclosure will be described with reference to the accompanying drawings, wherein like numbers reference like elements.

FIG. 1B is a schematic plan view illustrating the arrangement position of a protruding portion 1aa.

FIG. 11 is a diagram for describing examples of inspection signals supplied at the time of inspection of the active matrix substrate 301b according to the first modified example of the second embodiment.

FIG. 15 is a schematic view illustrating the configuration of an active matrix substrate 601a according to a fourth embodiment.

DESCRIPTION OF EMBODIMENTS

Figure 1A:
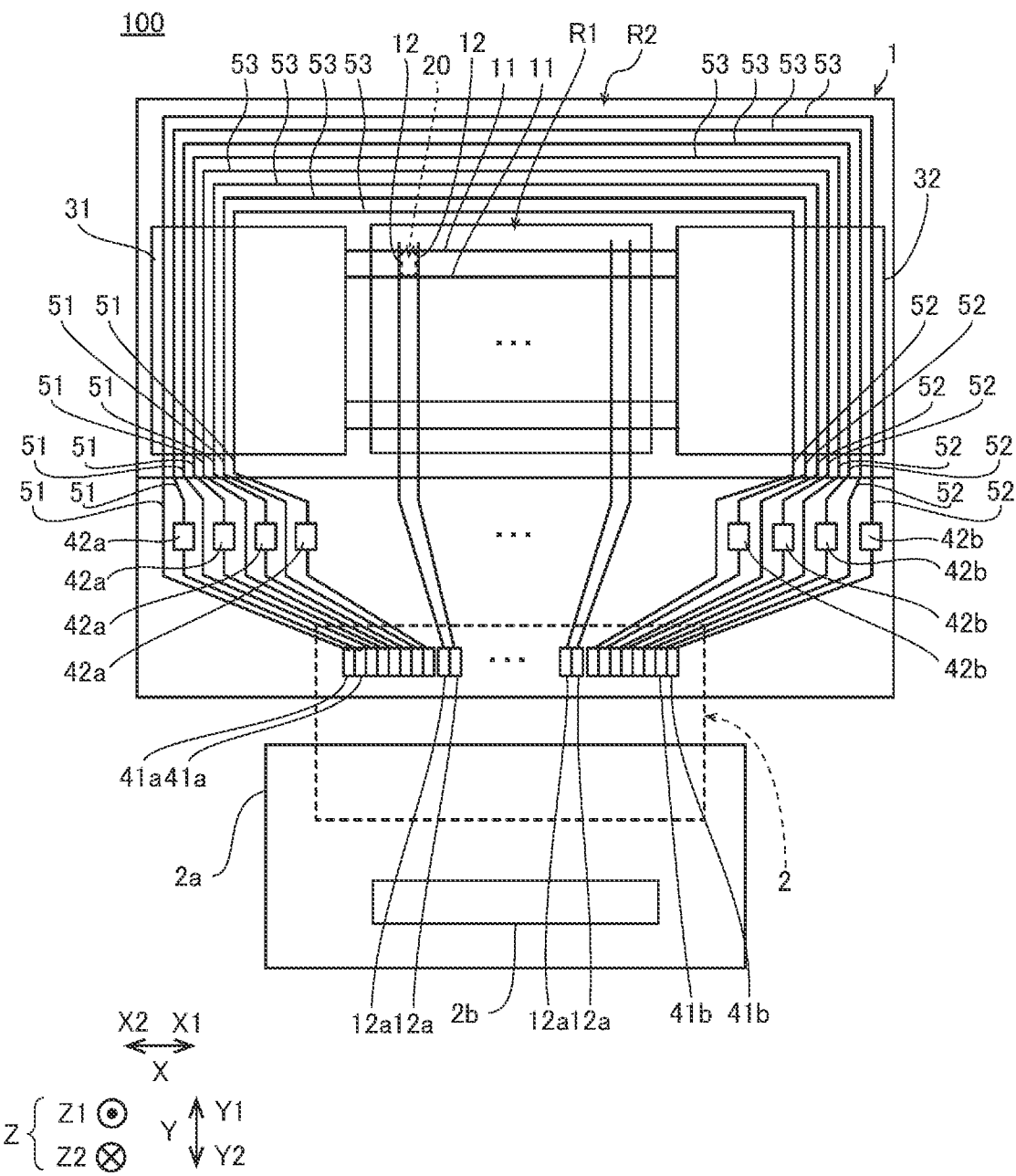
FIG. 1A is a schematic plan view illustrating the configuration of a display device 100 according to a first embodiment.

Hereinafter, embodiments of the disclosure will be described in detail with reference to the drawings. In the drawings, the same or corresponding portions are denoted by the same reference signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios.

First Embodiment

Overall Configuration of Display Device

Figure 2:
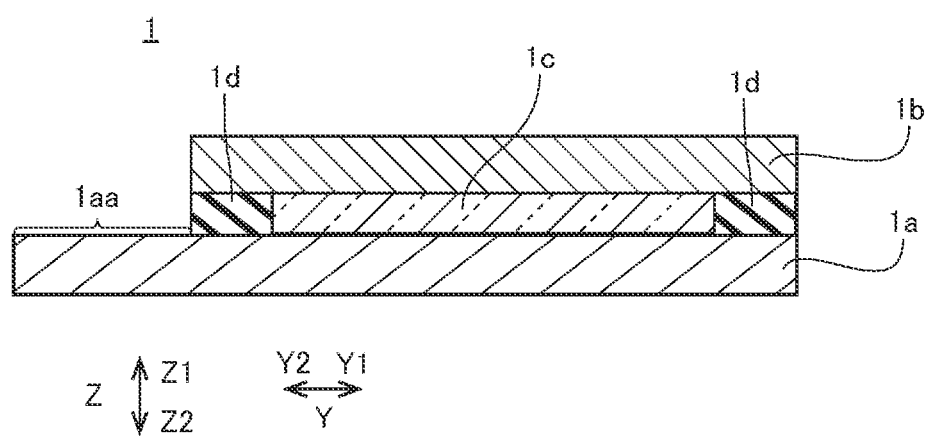
FIG. 2 is a schematic cross-sectional view of a display panel 1.

A configuration of a display device 100 according to a first embodiment will be described. FIG. 1A is a schematic plan view illustrating the configuration of the display device 100 according to the first embodiment. FIG. 1B is a schematic plan view illustrating the arrangement position of a protruding portion 1aa. FIG. 2 is a schematic cross-sectional view of a display panel 1.

As illustrated in FIG. 1A, the display device 100 includes the display panel 1, a flexible printed circuit board 2 (hereinafter referred to as "FPC 2"), and a printed wiring board 2a (hereinafter referred to as "PWB 2a"). As illustrated in FIG. 2, the display panel 1 includes an active matrix substrate 1a, a counter substrate 1b disposed opposite the active matrix substrate 1a, and a liquid crystal layer 1c disposed between the active matrix substrate 1a and the counter substrate 1b. The liquid crystal layer 1c is surrounded and sealed by a seal portion 1d interposed between the active matrix substrate 1a and the counter substrate 1b. Also, the counter substrate 1b is located opposite to at least a pixel region R1 described below, and the active matrix substrate 1a includes the protruding portion 1aa that protrudes out to the side of the counter substrate 1b in a Y2 direction described below as illustrated in FIGS. 1B and 2. The PWB 2a is mounted on the protruding portion 1aa.

As illustrated in FIG. 1A, a control circuit element 2b is mounted on the PWB 2a. The control circuit element 2b includes, for example, an integrated circuit. Also, the control circuit element 2b transmits control signals to the active matrix substrate 1a via the FPC 2. The FPC 2 electrically connects the control circuit element 2b of the PWB 2a and a plurality of gate terminals 41a and 41b and a plurality of source terminals 12a.

Configuration of Active Matrix Substrate 1a

As illustrated in FIG. 1A, gate drive circuits 31 and 32, the plurality of gate terminals 41a and 41b, the plurality of source terminals 12a, and a plurality of inspection terminals 42a and 42b are provided on the active matrix substrate 1a. Also, a plurality of gate lines 11, a plurality of source lines 12, a plurality of signal lines 51, a plurality of signal lines 52, and a plurality of connection lines 53 are provided on the active matrix substrate 1a.

For convenience of description, an X-axis, a Y-axis, and a Z-axis are defined to indicate the directions in FIG. 1A. The X-axis in FIG. 1A is the horizontal axis of the paper surface of FIG. 1A. The direction from left to right along the X-axis of the paper surface of FIG. 1A is defined as an X1 direction, and the direction from right to left is defined as an X2 direction. In the following description, a direction along the X-axis irrespective of the left-right orientation may be referred to as an "X direction". In a similar manner, the direction from down to up along the Y-axis of the paper surface of FIG. 1A is defined as a Y1 direction, and the direction from up to down is defined as the Y2 direction. A direction along the Y-axis irrespective of the up-down orientation may be referred to as a "Y direction". The Z-axis in FIG. 1A is an axis orthogonal to the X-axis and orthogonal to the Y-axis. The direction from back to front along the Z-axis of the paper surface of FIG. 1A is defined as a Z1 direction, and the direction from front to back is defined as a Z2 direction. The same applies for FIG. 1B onward.

As illustrated in FIG. 1A, the plurality of gate lines 11 extend in the X direction between the gate drive circuit 31 and the gate drive circuit 32. Also, the plurality of gate lines 11 are connected to both the gate drive circuit 31 and the gate drive circuit 32. The gate drive circuit 31 is disposed on the X2 direction side of the plurality of gate lines 11. The gate drive circuit 32 is disposed on the X1 direction side of the plurality of gate lines 11. Here, when only one gate drive circuit is disposed and a gate signal is supplied only from the gate lines on one side, the waveform of the gate signal may be blunted at the portion of the gate lines on the other side. In particular, when the display panel 1 has an increased size, the waveform is likely to be blunted. On the other hand, in the first embodiment, the gate drive circuit 31 supplies a gate signal Gout to the plurality of gate lines 11 from the X2 direction. Also, the gate drive circuit 32 supplies the gate signal Gout to the plurality of gate lines 11 from the X1 direction. Accordingly, compared to when the gate signal is supplied only from one gate drive circuit, the gate signal Gout can be prevented from being blunted and the display quality can be improved. The plurality of source lines 12 extend from the plurality of source terminals 12a in the Y1 direction. Then, the plurality of gate lines 11 and the plurality of source lines 12 meet. Pixels 20 are formed in the regions defined by the plurality of gate lines 11 and the plurality of source lines 12. In the disclosure, a region where the pixels 20 are formed is referred to as the pixel region R1. Note that although the pixel region R1 is illustrated in a rectangular shape in a plan view in the present embodiment, for example, the pixel region R1 may be formed in a circular shape, or may be formed in a polygonal shape other than a rectangular shape. Also, on the display panel 1, the region that is not the pixel region R1 is referred to as a frame region R2. The frame region R2 includes the protruding portion 1aa.

Figure 3:
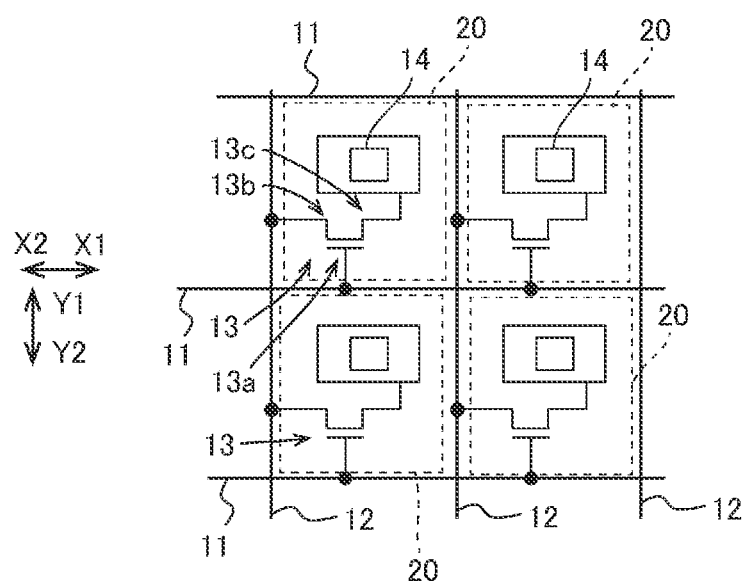
FIG. 3 is a schematic diagram illustrating the configuration of pixels 20.

FIG. 3 is a schematic diagram illustrating the configuration of the pixels 20. A thin film transistor 13 and a pixel electrode 14 are formed in each pixel 20. The thin film transistor 13 includes a gate electrode 13a, a source electrode 13b, and a drain electrode 13c. The gate electrode 13a is connected to the gate line 11. The source electrode 13b is connected to the source line 12. The drain electrode 13c is connected to the pixel electrode 14. Also, in the thin film transistor 13, a semiconductor layer (not illustrated) connected to the source electrode 13b and the drain electrode 13c is formed. When the gate signal Gout supplied from the gate line 11 to the gate electrode 13a is the on potential, a source signal supplied from the source line 12 to the source electrode 13b is written to the pixel electrode 14. Accordingly, an electrical field is formed between the pixel electrode 14 and the non-illustrated counter electrode, the liquid crystal layer 1c enclosed between the active matrix substrate 1a and the counter substrate 1b is driven, and an image is displayed on the display panel 1.

As illustrated in FIG. 1A, the gate drive circuit 31 is disposed in a region of the frame region R2 on the X2 direction side as seen from the pixel region R1. Also, the gate drive circuit 32 is disposed in a region of the frame region R2 on the X1 direction side as seen from the pixel region R1. The gate drive circuits 31 and 32 are disposed opposite the counter substrate 1b.

As illustrated in FIG. 1A, the plurality of gate terminals 41a are respectively connected to the plurality of signal lines 51. The number of the gate terminals 41a is the same as the number of the signal lines 51. Also, the plurality of gate terminals 41a are disposed in a region of the protruding portion 1aa on the Y2 direction side as seen from the pixel region R1. The plurality of gate terminals 41b are respectively connected to the plurality of signal lines 52. The number of the gate terminals 41b is the same as the number of the signal lines 52. Also, the plurality of gate terminals 41b are disposed in a region of the protruding portion 1aa on the Y2 direction side as seen from the pixel region R1. Also, the plurality of gate terminals 41b are disposed in a region on the X1 direction side as seen from the plurality of gate terminals 41a.

The plurality of source terminals 12a are respectively connected to the plurality of source lines 12. The number of the source terminals 12a is the same as the number of the source lines 12. Also, the plurality of source terminals 12a are disposed in a region of the protruding portion 1aa on the Y2 direction side as seen from the pixel region R1. The plurality of source terminals 12a are disposed between the plurality of gate terminals 41a and the plurality of gate terminals 41b in the X direction. The plurality of source terminals 12a supply source signals supplied from the control circuit element 2b to the thin film transistors 13 via the source lines 12. Although not illustrated in FIG. 1A, a source drive circuit that generates source signals on the basis of signals from the control circuit element 2b may be provided between the plurality of source terminals 12a and the control circuit element 2b.

Also, the plurality of inspection terminals 42a are disposed in a region of the protruding portion 1aa on the Y2 direction side as seen from the gate drive circuit 31. For example, the plurality of inspection terminals 42a are respectively disposed on the plurality of signal lines 51. The plurality of inspection terminals 42b are disposed in a region of the protruding portion 1aa on the Y2 direction side as seen from the gate drive circuit 32. Accordingly, the plurality of inspection terminals 42a and 42b are disposed separated in the X direction (disposed at a distance from one another). For example, the plurality of inspection terminals 42b are respectively disposed on the plurality of signal lines 52.

Not-illustrated inspection electrodes come into contact with the plurality of inspection terminals 42a and 42b at the time of inspection of the active matrix substrate 1a. At the time of inspection, inspection signals are supplied from the inspection electrodes to the plurality of inspection terminals 42a and 42b. The inspection signal is, for example, the same signal as the control signal supplied to the gate terminals 41a or a constant voltage. Note that the area of each of the inspection terminals 42a and 42b is preferably greater than the area of each of the gate terminals 41a and 41b so that the inspection electrode is appropriately brought into contact with the target inspection terminal and the wiring lines at the periphery of the inspection terminal and the like are not damaged by the inspection electrode. The area of the inspection terminal 42a is equal to or greater than twice the area of the gate terminal 41a, for example. More specifically, the area of the inspection terminal 42a ranges from 2.5 times to 80 times the area of the gate terminal 41a, for example. Here, the area of the inspection terminal 42a is defined as the area of the region where an inspection signal can be input by bringing the inspection electrode into contact with the inspection terminal 42a as seen from the Z-axis direction.

Figure 4:
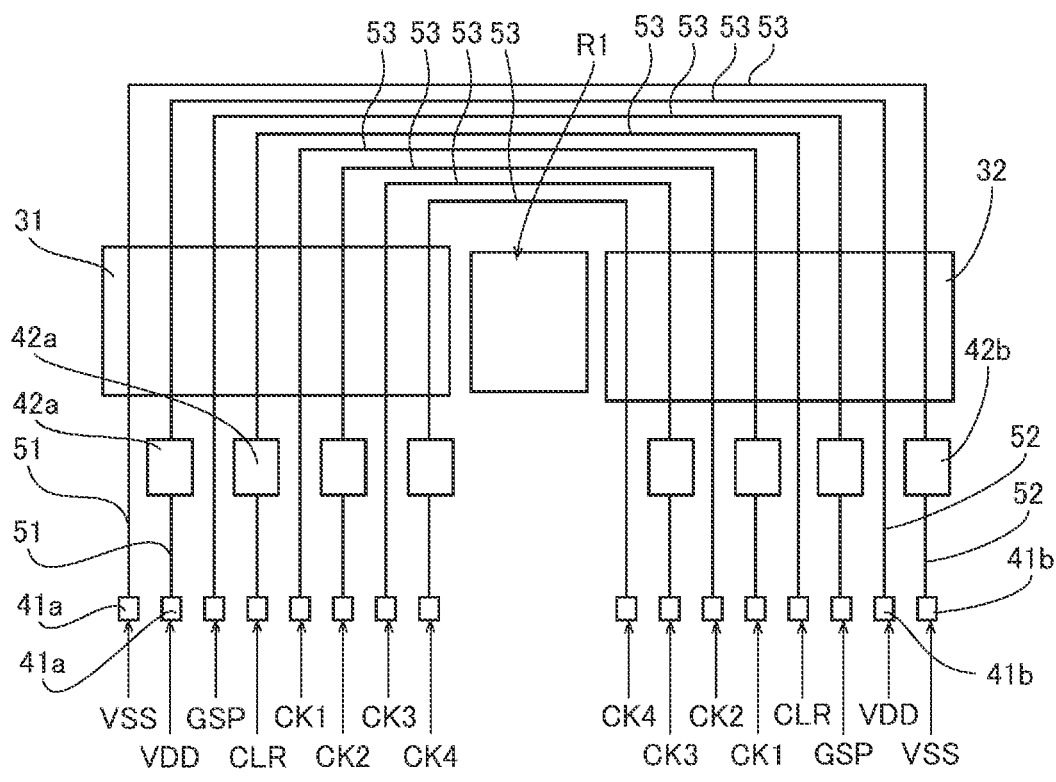
FIG. 4 is a schematic view illustrating a portion of the configuration of an active matrix substrate 1a according to the first embodiment.

FIG. 4 is a schematic view illustrating a portion of the configuration of the active matrix substrate 1a according to the first embodiment. Control signals are supplied from the control circuit element 2b to the plurality of gate terminals 41a and the plurality of gate terminals 41b. The control signals include, for example, a gate start pulse signal (hereinafter referred to as "GSP signal"), four clock signals (hereinafter referred to as "CK1 signal", "CK2 signal", "CK3 signal", and "CK4 signal"), a clear signal (hereinafter referred to as "CLR signal"), a first constant voltage signal (hereinafter referred to as "VDD signal"). and a second constant voltage signal (hereinafter referred to as "VSS signal"). Note that the control signals are not limited to the examples described above, and the number of clock signals may be any number from 2 to 16, for example. Also, a plurality of GSP signals and CLR signals may be provided. Furthermore, the VDD signal may not be included as a control signal. Also, a signal having a waveform different from that of the above-described example may be included as a control signal.

In the first embodiment, the plurality of gate terminals 41a include the gate terminal 41a supplied with the GSP signal, the gate terminal 41a supplied with the CK1 signal, the gate terminal 41a supplied with the CK2 signal, the gate terminal 41a supplied with the CK3 signal, the gate terminal 41a supplied with the CK4 signal, the gate terminal 41a supplied with the CLR signal, the gate terminal 41a supplied with the VDD signal, and the gate terminal 41a supplied with the VSS signal. Also, the plurality of gate terminals 41b include the gate terminal 41b supplied with the GSP signal, the gate terminal 41b supplied with the CK1 signal, the gate terminal 41b supplied with the CK2 signal, the gate terminal 41b supplied with the CK3 signal, the gate terminal 41b supplied with the CK4 signal, the gate terminal 41b supplied with the CLR signal, the gate terminal 41b supplied with the VDD signal, and the gate terminal 41b supplied with the VSS signal.

According to this configuration, the control signals from the gate terminals 41a are supplied to the gate drive circuit 31, and the control signals from the gate terminals 41b are supplied to the gate drive circuit 32. Accordingly, unlike when the control signals pass through the wiring line formed running between the gate drive circuits 31 and 32 from one to the other, the control signals supplied to the gate drive circuits 31 and 32 are unlikely to have a blunted waveform. As a result, the thin film transistor 13 can be operated at the appropriate timing, allowing the display quality to be improved.

Here, the number of the inspection terminals 42a is less than the number of the gate terminals 41a. In the first embodiment, the number of the inspection terminals 42a is half the number of the gate terminals 41a. Also, the number of the inspection terminals 42b is less than the number of the gate terminals 41b. In the first embodiment, the number of the inspection terminals 42b is half the number of the gate terminals 41b. For example, the plurality of inspection terminals 42a include the inspection terminal 42a disposed on the signal line 51 that transmits the VDD signal, the inspection terminal 42a disposed on the signal line 51 that transmits the CLR signal, the inspection terminal 42a disposed on the signal line 51 that transmits the CK2 signal, and the inspection terminal 42a disposed on the signal line 51 that transmits the CK4 signal. More specifically, for example, the inspection terminal 42a disposed on the signal line 51 that transmits the VDD signal is electrically connected to the signal line 51 that transmits the VDD signal or is formed integrally with the signal line 51 that transmits the VDD signal at a region of the protruding portion 1aa between the gate terminal 41a supplied with the VDD signal and the gate drive circuit 31. The plurality of inspection terminals 42a are not disposed on the signal line 51 that transmits the VSS signal, the signal line 51 that transmits the GSP signal, the signal line 51 that transmits the CK1 signal, and the signal line 51 that transmits the CK3 signal. Also, the plurality of inspection terminals 42b include the inspection terminal 42b disposed on the signal line 52 that transmits the VSS signal, the inspection terminal 42b disposed on the signal line 52 that transmits the GSP signal, the inspection terminal 42b disposed on the signal line 52 that transmits the CK1 signal, and the inspection terminal 42b disposed on the signal line 52 that transmits the CK3 signal. More specifically, for example, the inspection terminal 42b disposed on the signal line 52 that transmits the VSS signal is electrically connected to the signal line 52 that transmits the VSS signal or is formed integrally with the signal line 52 that transmits the VSS signal at a region of the protruding portion 1aa between the gate terminal 41b supplied with the VSS signal and the gate drive circuit 32. The plurality of inspection terminals 42b are not disposed on the signal line 52 that transmits the VDD signal, the signal line 52 that transmits the CLR signal, the signal line 52 that transmits the CK2 signal, and the signal line 52 that transmits the CK4 signal.

As illustrated in FIG. 4, in the first embodiment, the inspection terminals 42a are not disposed on the signal lines 51 adjacent to the inspection terminals 42a in the X1 direction and the signal lines 51 adjacent to the inspection terminals 42a in the X2 direction. Also, the inspection terminals 42b are not disposed on the signal lines 52 adjacent to the inspection terminals 42b in the X1 direction and the signal lines 52 adjacent to the inspection terminals 42b in the X2 direction. The inspection signals input from the inspection terminals 42a or 42b are supplied to both of the gate drive circuits 31 and 32. Accordingly, in the first embodiment, the number of inspection terminals can be made less compared to a configuration without connection lines in which inspection terminals are provided for each signal line connected to the first gate drive circuit and each signal line connected to the second gate drive circuit. Also, the inspection terminals 42a and 42b are used only at the time of inspection, and after the product (display device 100) is completed and shipped, when the user visually recognizes the display, the inspection terminals 42a and 42b are not used and thus do not affect the display quality.

As illustrated in FIG. 4, the plurality of connection lines 53 are disposed in a region of the frame region R2 on the Y1 direction side as seen from the pixel region R1. Accordingly, the plurality of connection lines 53 and the plurality of inspection terminals 42a and 42b can be disposed separated in the frame region R2. Also, the plurality of connection lines 53 are disposed with a portion extending from the gate drive circuits 31 and 32 in the Y1 direction and include a portion extending in the X direction. The plurality of connection lines 53 are respectively connected to the plurality of signal lines 51 and the plurality of signal lines 52. For example, the plurality of connection lines 53 include the connection line 53 connecting the signal line 51 supplied with the GSP signal and the signal line 52 supplied with the GSP signal, the connection line 53 connecting the signal line 51 supplied with the VSS signal and the signal line 52 supplied with the VSS signal, the connection line 53 connecting the signal line 51 supplied with the VDD signal and the signal line 52 supplied with the VDD signal, the connection line 53 connecting the signal line 51 supplied with the CLR signal and the signal line 52 supplied with the CLR signal, the connection line 53 connecting the signal line 51 supplied with the CK1 signal and the signal line 52 supplied with the CK1 signal, the connection line 53 connecting the signal line 51 supplied with the CK2 signal and the signal line 52 supplied with the CK2 signal, the connection line 53 connecting the signal line 51 supplied with the CK3 signal and the signal line 52 supplied with the CK3 signal, and the connection line 53 connecting the signal line 51 supplied with the CK4 signal and the signal line 52 supplied with the CK4 signal.

The plurality of connection lines 53 transmit inspection signals supplied to the inspection terminals 42a when the display panel 1 or the active matrix substrate 1a is inspected to the signal lines 52. Also, the plurality of connection lines 53 transmit inspection signals supplied to the inspection terminals 42b when the display panel 1 or the active matrix substrate 1a is inspected to the signal lines 51. By using the inspection terminals 42a and 42b, all the signal lines 51 and 52 and the gate drive circuits 31 and 32 connected to the signal lines 51 and 52 can be inspected.

Figure 5:
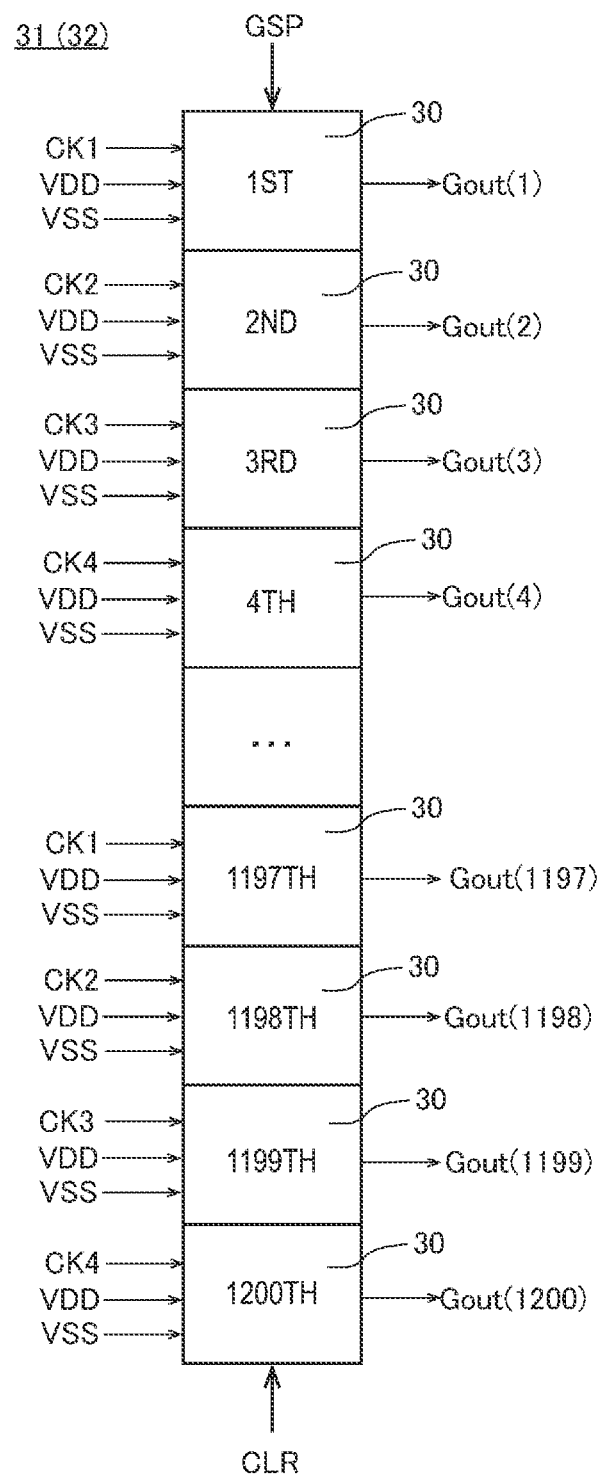
FIG. 5 is a diagram illustrating the configuration of gate drive circuits 31 and 32.

FIG. 5 is a diagram illustrating the configuration of the gate drive circuits 31 and 32. As illustrated in FIG. 5, the gate drive circuit 31 is provided with a plurality of unit circuits 30. For example, the gate drive circuit 31 is provided with the same number of unit circuits 30 as the number of the gate lines 11. For example, 1200 unit circuits 30 are provided in the gate drive circuit 31. Hereinafter, to distinguish between the 1200 unit circuits 30, the unit circuits 30 are referred to as the 1st unit circuit 30 to the 1200th unit circuit 30. Note that in the example illustrated in FIG. 5, 1200 unit circuits 30 are provided in the gate drive circuit 31, the number of the unit circuits 30 depends on the number of the gate lines 11 and may be a number less than 1200 or a number equal to or greater than 1201. Since the gate drive circuit 32 has the same configuration as the gate drive circuit 31, description thereof is omitted.

Figure 6:
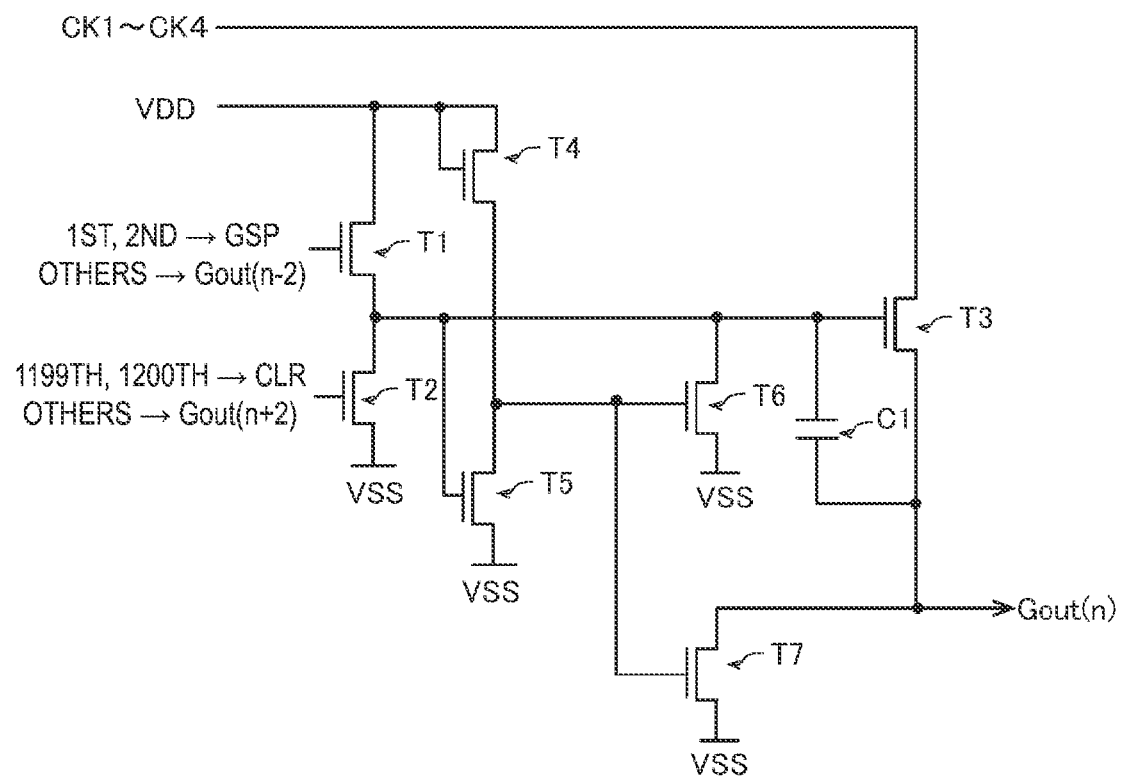
FIG. 6 is a circuit diagram illustrating the configuration of unit circuits 30.

FIG. 6 is a circuit diagram illustrating the configuration of the unit circuits 30. In FIG. 6, the 3rd to 1198th unit circuits 30 are represented as the n-th unit circuits 30. The 1st unit circuit 30 outputs the gate signal Gout(1). The 2nd unit circuit 30 outputs the gate signal Gout(2). The n-th unit circuit 30 outputs the gate signal Gout(n). The 1199th unit circuit 30 outputs the gate signal Gout(1199). The 1200th unit circuit 30 outputs the gate signal Gout(1200). As illustrated in FIG. 6, the unit circuit 30 includes transistors T1, T2, T3, T4, T5, T6, and T7 and a capacitor C1. These transistors and capacitors are monolithically provided using the films (for example, the same film as the thin film transistor 13) provided on the active matrix substrate 1a.

In the case of the 1st unit circuit 30 and the 2nd unit circuit 30, the GSP signal is supplied to the gate of the transistor T1. Also, in the case of the n-th unit circuit 30, the gate signal Gout(n−2) is supplied to the gate of the transistor T1. The VDD signal is supplied to the source of the transistor T1. The drain of the transistor T1 is connected to the source of the transistor T2, the source of the transistor T6, the gate of the transistor T3, and the capacitor C1.

In the case of the 1199th unit circuit 30 and the 1200th unit circuit 30, the CLR signal is supplied to the gate of the transistor T2. Also, in the case of the n-th unit circuit 30, the gate signal Gout(n+2) is supplied to the gate of the transistor T2. The VSS signal is supplied to the drain of the transistor T2.

One of the CK1 signal to the CK4 signal (see FIG. 5) is supplied to the source of the transistor T3. The drain of the transistor T3 is connected to the capacitor C1, the source of the transistor T7, and the gate line 11.

The VDD signal is supplied to the gate and the source of the transistor T4. The drain of the transistor T4 is connected to the source of the transistor T5, the gate of the transistor T6, and the gate of the transistor T7.

The VSS signal is supplied to the drain of the transistor T5, the drain of the transistor T6, and the drain of the transistor T7.

Figure 7:
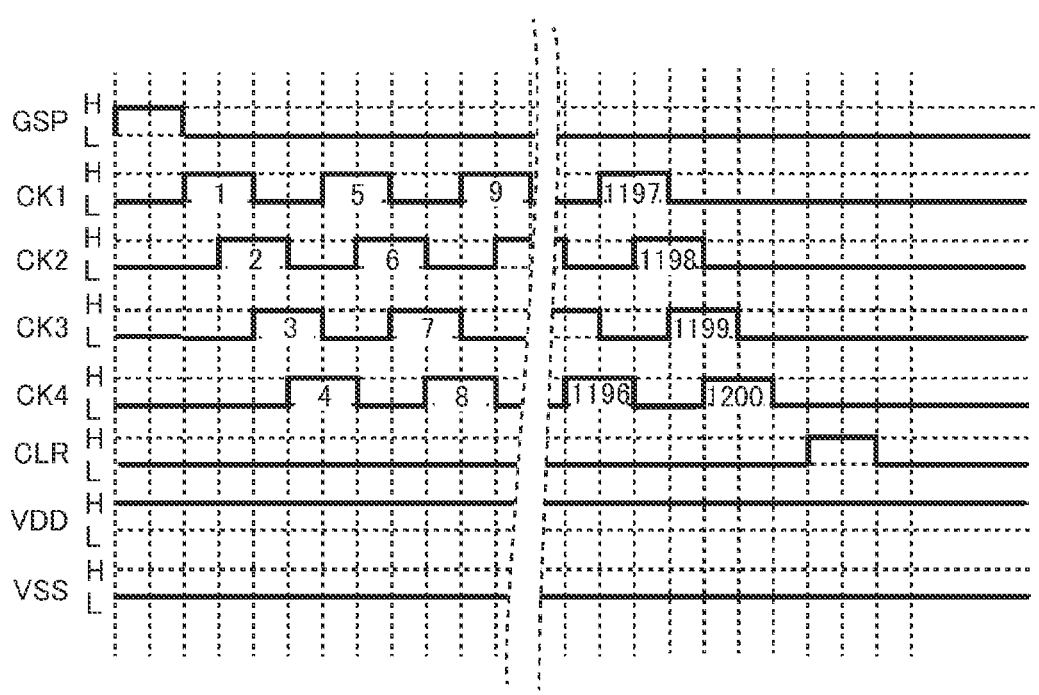
FIG. 7 is a timing chart for describing the relationship between the control signal supplied to the gate drive circuit 31 and the output gate signal.

FIG. 7 is a timing chart for describing the relationship between the control signal supplied to the gate drive circuit 31 and the output gate signal. As illustrated in FIG. 7, after the level of the voltage of the GSP signal is High, the levels of the CK1 signal to the CK4 signal repeatedly switch to High in this order. Thereafter, the level of the CLR signal switches to High. The level of the VDD signal is always High, and the level of the VSS signal is always Low. Accordingly, the gate signals Gout(1) to Gout(1200) are sequentially output from the gate drive circuit 31 to the gate line 11. "1" to "1200" described in the waveforms of the CK1 signal to the CK4 signal in FIG. 7 indicate the timing at which the gate signals Gout(1) to Gout(1200) are output.

Modified Example of First Embodiment

Figure 8:
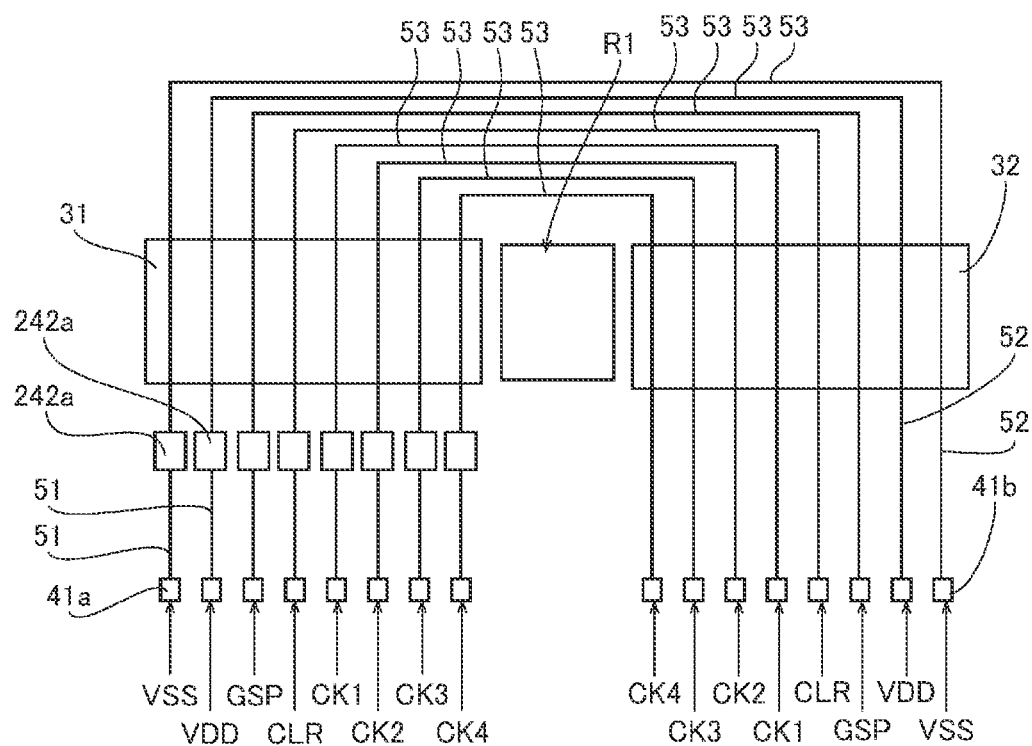
FIG. 8 is a schematic view illustrating the configuration of an active matrix substrate 201a according to a modified example of the first embodiment.

Next, the configuration of an active matrix substrate 201a according to a modified example of the first embodiment will be described with reference to FIG. 8. Note that constituents that are the same as those in the first embodiment are denoted by the same reference signs, and description thereof will be omitted. FIG. 8 is a schematic view illustrating the configuration of the active matrix substrate 201a according to the modified example of the first embodiment.

In the first embodiment, as illustrated in FIG. 4, the inspection terminals 42a are connected to the signal lines 51 and the inspection terminals 42b are connected to the signal lines 52. However, in the active matrix substrate 201a according to the modified example of the first embodiment, as illustrated in FIG. 8, all inspection terminals 242a are connected to the signal lines 51 and none are connected to the signal lines 52. The inspection signals input from the inspection terminals 242a at the time of inspection are supplied to both of the gate drive circuits 31 and 32. Accordingly, in the modified example of the first embodiment also, the number of inspection terminals can be made less compared to a configuration without connection lines in which inspection terminals are provided for each signal line connected to the first gate drive circuit and each signal line connected to the second gate drive circuit. Also, the inspection terminals 242a are used only at the time of inspection, and after the active matrix substrate 201a is completed as a product and shipped, when the user visually recognizes the display, the inspection terminals 242a are not used and thus do not affect the display quality.

Second Embodiment

Figure 9:
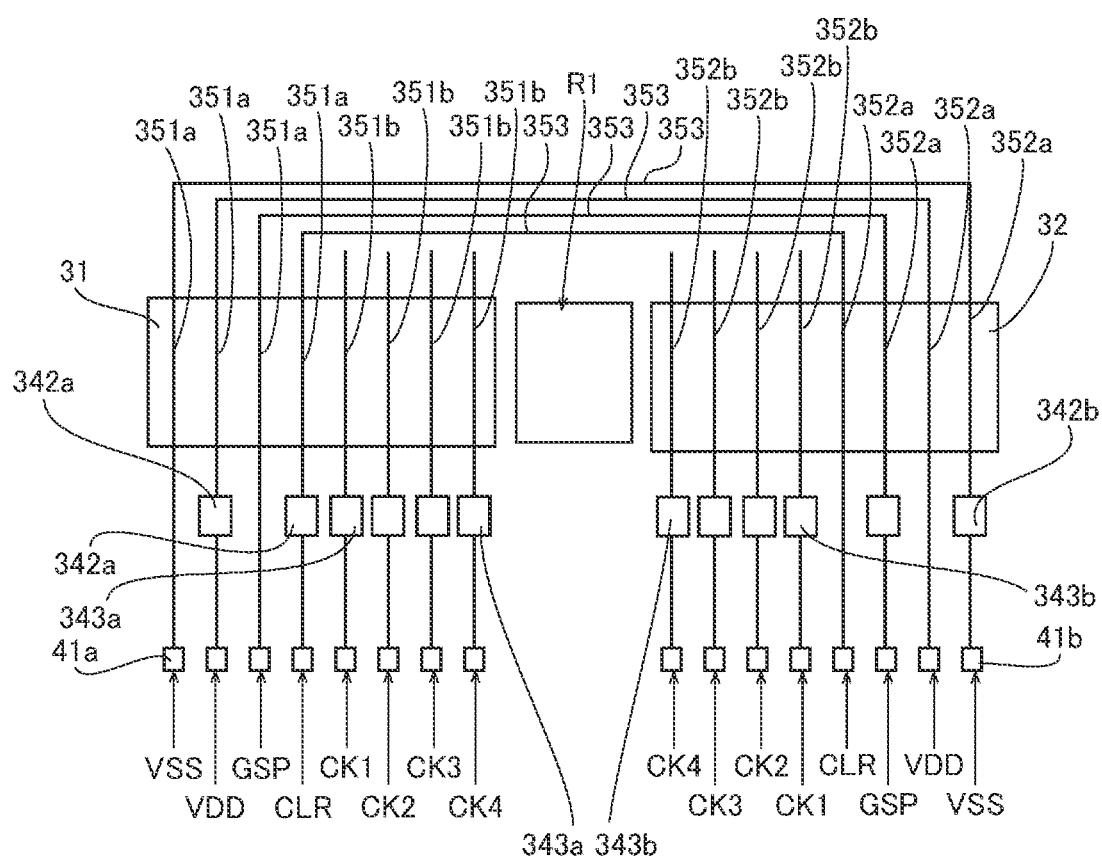
FIG. 9 is a schematic view illustrating the configuration of an active matrix substrate 301a according to a second embodiment.

Next, the configuration of an active matrix substrate 301a according to a second embodiment will be described with reference to FIG. 9. Note that constituents that are the same as those in the first embodiment are denoted by the same reference signs, and description thereof will be omitted. FIG. 9 is a schematic view illustrating the configuration of the active matrix substrate 301a according to the second embodiment.

As illustrated in FIG. 9, the active matrix substrate 301a according to the second embodiment includes a plurality of inspection terminals 342a and 342b, a plurality of clock inspection terminals 343a and 343b, a plurality of signal lines 351a and 352a, a plurality of clock signal lines 351b and 352b, and connection lines 353.

The plurality of clock signal lines 351b are connected to the gate terminals 41a that supply one of the CK1 signal to the CK4 signal. The plurality of clock signal lines 352b are connected to the gate terminals 41b that supply one of the CK1 signal to the CK4 signal. The plurality of clock inspection terminals 343a are respectively connected to the plurality of clock signal lines 351b. The plurality of clock inspection terminals 343b are respectively connected to the plurality of clock signal lines 352b. That is, in the second embodiment, the total number of the clock inspection terminals 343a and the clock inspection terminals 343b is equal to the total number of the clock signal lines 351b and the clock signal lines 352b. Also, in the second embodiment, the clock signal lines 351b and the clock signal lines 352b are not connected.

Also, the plurality of inspection terminals 342a include the inspection terminal 342a disposed on the signal line 351a supplied with the VDD signal and the inspection terminal 342a disposed on the signal line 351a supplied with the CLR signal. Also, the plurality of inspection terminals 342a are not disposed on the signal lines 351a supplied with the VSS signal and the signal lines 351a supplied with the GSP signal. The plurality of inspection terminals 342b include the inspection terminal 342b disposed on the signal line 352a supplied with the VSS signal and the inspection terminal 342b disposed on the signal line 352a supplied with the GSP signal. Also, the plurality of inspection terminals 342b are not disposed on the signal lines 352a supplied with the VDD signal and the signal lines 352a supplied with the CLR signal.

The connection lines 353 connect the signal lines 351a and the signal lines 352a supplied with the same control signal as the signal lines 351a. Other configurations are the same as or similar to the configurations in the first embodiment.

According to the configuration described above, at the time of inspection, the active matrix substrate 301a is provided with the clock inspection terminals 343a that can supply the CK1 signal to CK4 signal to the gate drive circuit 31 and the clock inspection terminals 343b that can supply the CK1 signal to the CK4 signal to the gate drive circuit 32. Accordingly, compared to a configuration without connection lines in which inspection terminals are provided for each signal line connected to the first gate drive circuit and each signal line connected to the second gate drive circuit, at the time of inspection, the waveforms of the CK1 signal to the CK4 signal can be prevented from being blunted and an erroneous inspection result can be prevented from being obtained. Note that the other effects are the same as or similar to the effects of the first embodiment.

First Modified Example of Second Embodiment

Figure 10:
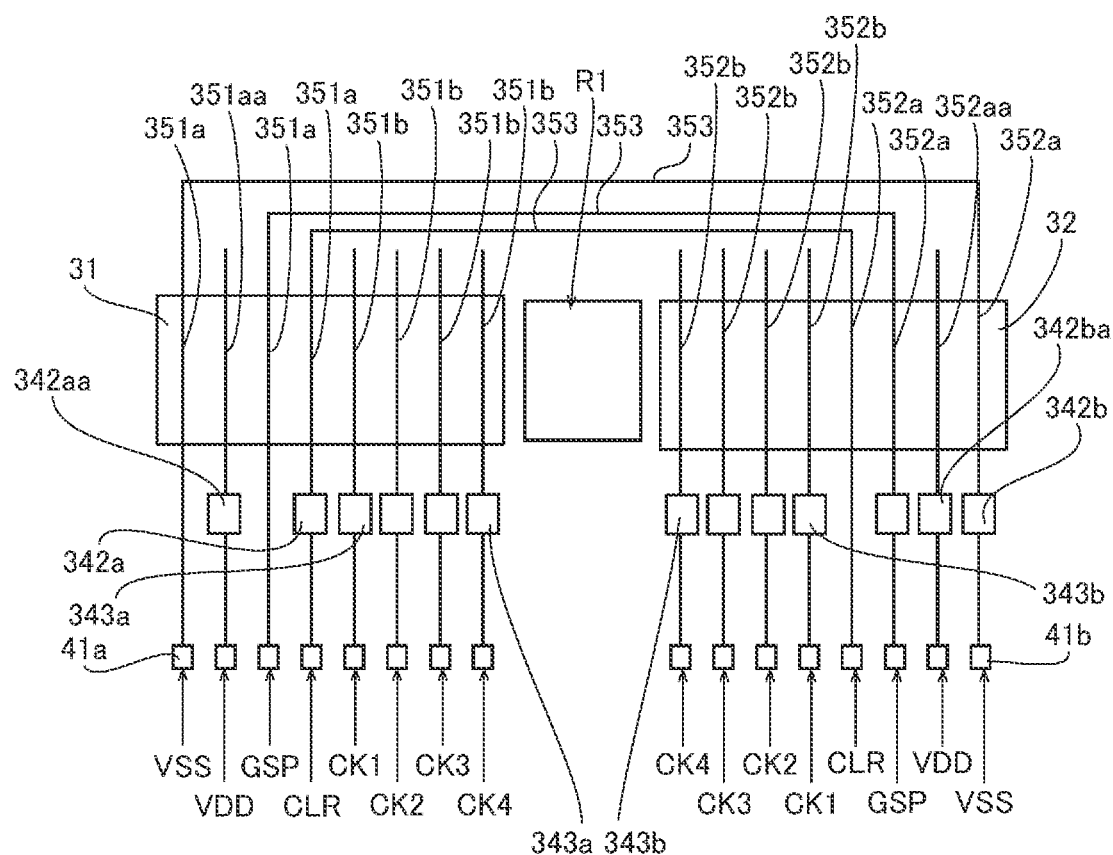
FIG. 10 is a schematic view illustrating the configuration of an active matrix substrate 301b according to a first modified example of the second embodiment.

Next, the configuration of an active matrix substrate 301b according to a first modified example of the second embodiment will be described with reference to FIGS. 10 and 11. Note that constituents that are the same as those in the second embodiment are denoted by the same reference signs, and description thereof will be omitted. FIG. 10 is a schematic view illustrating the configuration of the active matrix substrate 301b according to the first modified example of the second embodiment. FIG. 11 is a diagram for describing examples of inspection signals supplied at the time of inspection of the display panel 1 or the active matrix substrate 301b according to the first modified example of the second embodiment.

As illustrated in FIG. 10, the active matrix substrate 301b is different from the active matrix substrate 301a illustrated in FIG. 9 in that a first VDD inspection terminal 342aa is disposed on a signal line 351aa that supplies the VDD signal to the gate drive circuit 31 and a second VDD inspection terminal 342ba is disposed on a signal line 352aa that supplies the VDD signal to the gate drive circuit 32. Also, the signal line 351aa and the signal line 352aa are not connected.

Here, even when one of the two gate drive circuits is faulty and the other is not faulty, an inspection in which both of the two gate drive circuits are driven may result in an erroneous determination that the two gate drive circuits are not faulty. Thus, in the first modified example of the second embodiment, as illustrated in FIG. 11, after an inspection in which one of the gate drive circuits 31 and 32 is driven, an inspection in which the other is driven is performed. From among the plurality of clock inspection terminals 343a, the clock inspection terminal 343a supplied with the CK1 signal from the gate terminal 41a is referred to as a first CK1 inspection terminal, the clock inspection terminal 343a supplied with the CK2 signal from the gate terminal 41a is referred to as a first CK2 inspection terminal, the clock inspection terminal 343a supplied with the CK3 signal from the gate terminal 41a is referred to as a first CK3 inspection terminal, and the clock inspection terminal 343a supplied with the CK4 signal from the gate terminal 41a is referred to as a first CK4 inspection terminal. Also, from among the plurality of clock inspection terminals 343b, the clock inspection terminal 343b supplied with the CK1 signal from the gate terminal 41b is referred to as a second CK1 inspection terminal, the clock inspection terminal 343b supplied with the CK2 signal from the gate terminal 41b is referred to as a second CK2 inspection terminal, the clock inspection terminal 343b supplied with the CK3 signal from the gate terminal 41b is referred to as a second CK3 inspection terminal, and the clock inspection terminal 343b supplied with the CK4 signal from the gate terminal 41b is referred to as a second CK4 inspection terminal.

From among the inspection terminals 342a, the inspection terminal 342a supplied with the CLR signal from the gate terminal 41a is referred to as a CLR inspection terminal. Also, from among the inspection terminals 342b, the inspection terminal 342b supplied with the GSP signal from the gate terminal 41b is referred to as a GSP inspection terminal and the inspection terminal 342b supplied with the VSS signal from the gate terminal 41b is referred to as a VSS inspection terminal.

FIG. 11 illustrates correspondence examples of inspection terminals and signal waveforms when, of the gate drive circuits 31 and 32, the gate drive circuit 31 to be inspected is driven and the gate drive circuit 32 not to be inspected is in a floating state (non-driven state). In the case of the examples in FIG. 11, the GSP signal is supplied to the GSP inspection terminal. The CLR signal is supplied to the CLR inspection terminal. The VSS signal is supplied to the VSS inspection terminal. The CK1 signal is supplied to the first CK1 inspection terminal. The CK2 signal is supplied to the first CK2 inspection terminal. The CK3 signal is supplied to the first CK3 inspection terminal. The CK4 signal is supplied to the first CK4 inspection terminal. The VSS signal is supplied to the second CK1 inspection terminal to the second CK4 inspection terminal. In this state, an inspection of whether or not the thin film transistor 13 is appropriately driven by the gate drive circuit 31 is performed. Thereafter, the CK1 signal is supplied to the second CK1 inspection terminal. The CK2 signal is supplied to the second CK2 inspection terminal. The CK3 signal is supplied to the second CK3 inspection terminal. The CK4 signal is supplied to the second CK4 inspection terminal. The VSS signal is supplied to the first CK1 inspection terminal to the first CK4 inspection terminal. In this state, an inspection of whether or not the thin film transistor 13 is appropriately driven by the gate drive circuit 32 is performed. According to this inspection method, since the gate drive circuit 31 and the gate drive circuit 32 can be inspected separately and obtain different inspection results, compared to a configuration in which the gate drive circuits 31 and 32 are simultaneously inspected, obtaining erroneous inspection results can be prevented. Also, the active matrix substrate 301b is provided with the first CK1 inspection terminal to the first CK4 inspection terminal that supply inspection signals to the gate drive circuit 31 and the second CK1 inspection terminal to the second CK4 inspection terminal that supply inspection signals to the gate drive circuit 32. Accordingly, the waveforms of the inspection signals can be prevented from being blunted, unlike when the second CK1 inspection terminal to the second CK4 inspection terminal are not provided and the inspection signals are supplied from the first CK1 inspection terminal to the first CK4 inspection terminal to the gate drive circuit 32 via the connection lines. This also prevents an erroneous inspection result from being obtained. Since the GSP inspection terminals, the CLR inspection terminals, and the VSS inspection terminals are not disposed on both the signal lines 351a and the signal lines 352a, compared to a configuration in which they are disposed on both, the number of inspection terminals can be reduced.

Second Modified Example of Second Embodiment

Figure 12:
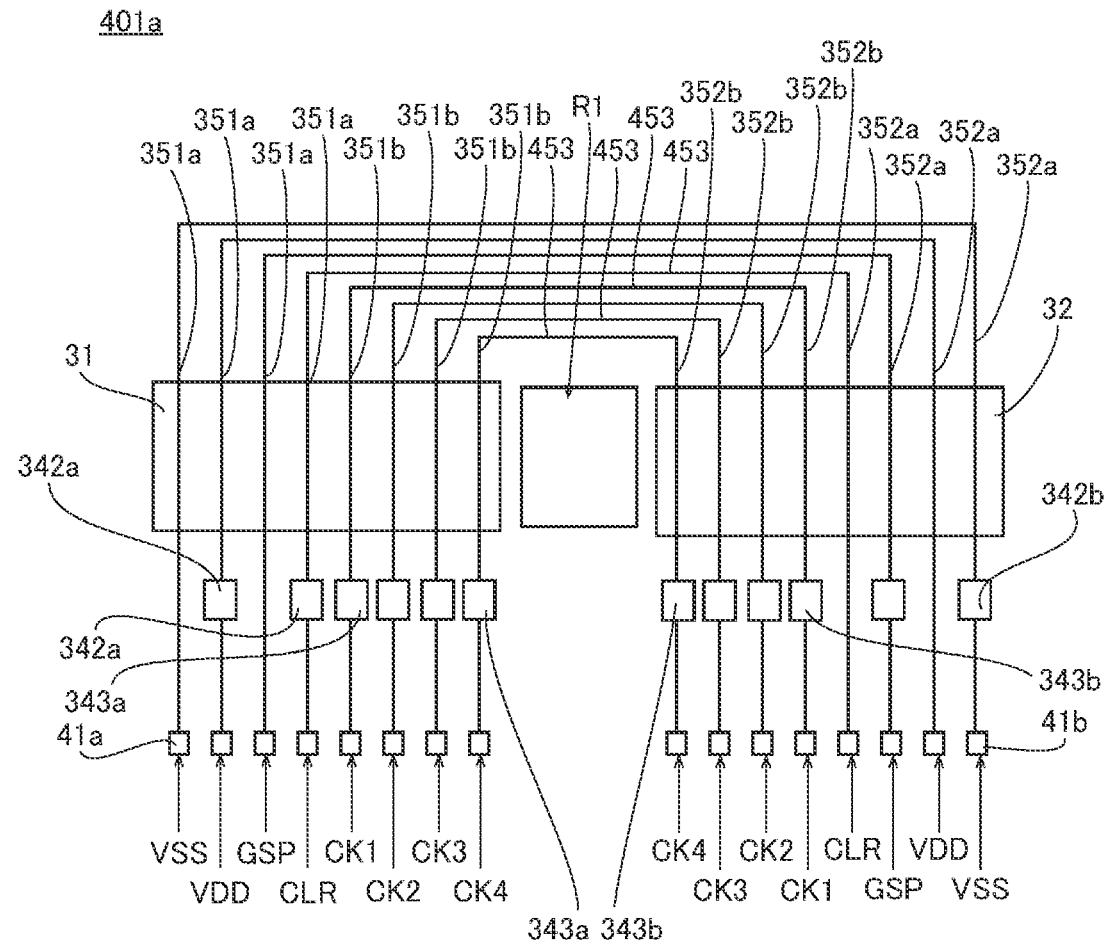
FIG. 12 is a schematic view illustrating the configuration of an active matrix substrate 401a according to a second modified example of the second embodiment.

Next, the configuration of an active matrix substrate 401a according to a second modified example of the second embodiment will be described with reference to FIG. 12. Note that constituents that are the same as those in the first or second embodiment are denoted by the same reference signs, and description thereof will be omitted. FIG. 12 is a schematic view illustrating the configuration of the active matrix substrate 401a according to the second modified example of the second embodiment.

As illustrated in FIG. 12, the active matrix substrate 401a according to the second modified example of the second embodiment is provided with a plurality of connection lines 453 connecting the plurality of clock signal lines 351b and the plurality of clock signal lines 352b of the active matrix substrate 201a according to the second embodiment. In this example, even though the plurality of connection lines 453 are provided, the active matrix substrate 401a is also provided with the first CK1 inspection terminal to the first CK4 inspection terminal that supply inspection signals to the gate drive circuit 31 and the second CK1 inspection terminal to the second CK4 inspection terminal that supply inspection signals to the gate drive circuit 32. Thus, the waveforms of the inspection signals can be prevented from being blunted. This also prevents an erroneous inspection result from being obtained. Also, since the GSP inspection terminals, the CLR inspection terminals, and the VSS inspection terminals are not disposed on both the signal lines 351a and the signal lines 352a, compared to a configuration in which they are disposed on both, the number of inspection terminals can be reduced.

Third Embodiment

Figure 13:
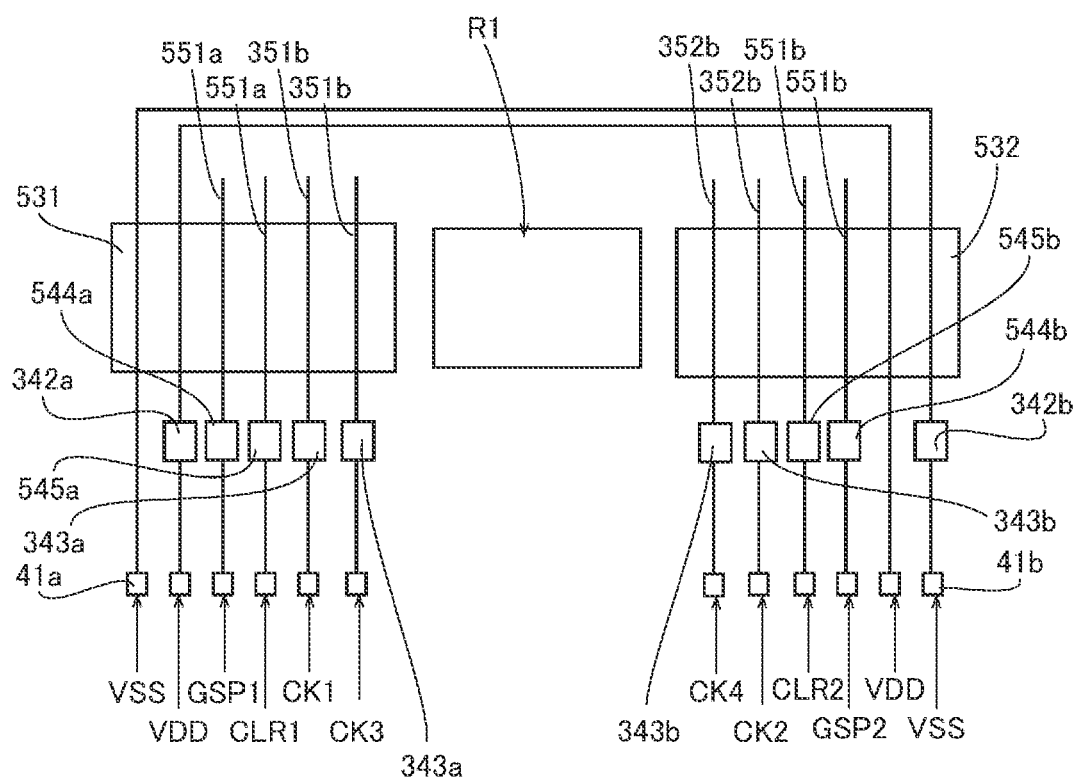
FIG. 13 is a schematic view illustrating the configuration of an active matrix substrate 501a according to a third embodiment.
Figure 14:
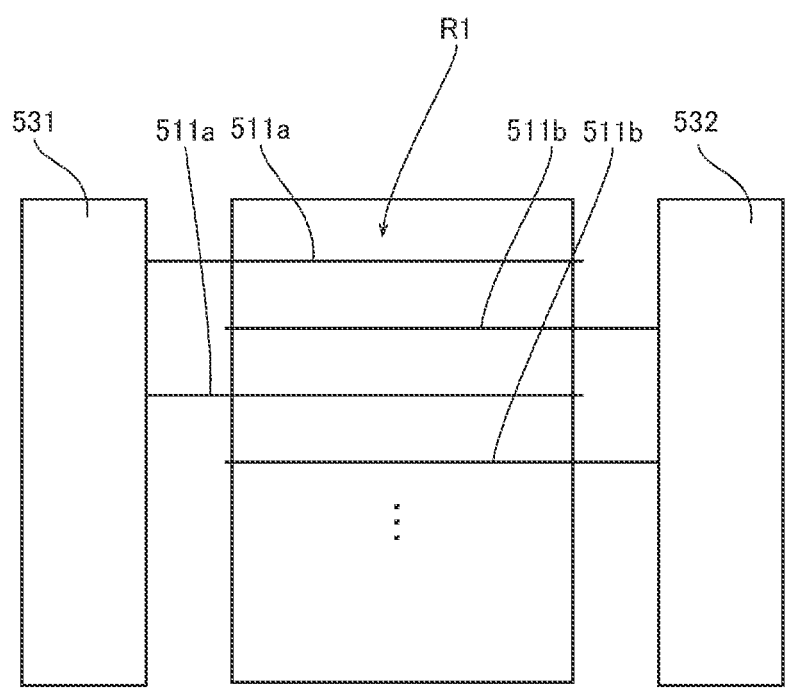
FIG. 14 is a schematic view for describing the interlaced drive according to the third embodiment.

Next, the configuration of an active matrix substrate 501a according to a third embodiment will be described with reference to FIGS. 13 and 14. Note that constituents that are the same as those in the first or second embodiment are denoted by the same reference signs, and description thereof will be omitted. FIG. 13 is a schematic view illustrating the configuration of the active matrix substrate 501a according to the third embodiment. FIG. 14 is a schematic view for describing the interlaced drive according to the third embodiment.

As illustrated in FIG. 13, the active matrix substrate 501a according to the third embodiment includes gate drive circuits 531 and 532. As illustrated in FIG. 14, gate lines 511a supplied with the gate signal by the gate drive circuit 531 and gate lines 511b supplied with the gate signal by the gate drive circuit 532 are different. The gate lines 511a and the gate lines 511b are alternately disposed in the direction orthogonal to the extending direction of the gate lines 511a. In other words, in the first embodiment described above, the gate signal Gout is supplied to one gate line 11 from both sides via the gate drive circuits 31 and 32. However, in the active matrix substrate 501a according to the third embodiment, interlaced drive is performed to supply the gate signal Gout from the gate drive circuit on one side to one gate line.

In the case of interlaced drive, the CLR signal supplied to the gate drive circuit 531 is a different signal (signal with different timing) to the CLR signal supplied to the gate drive circuit 532. Also, the GSP signal supplied to the gate drive circuit 532 is a different signal (signal with different timing) to the GSP signal supplied to the gate drive circuit 532. Here, the CLR signal supplied to the gate drive circuit 531 is defined as a CLR1 signal. The CLR signal supplied to the gate drive circuit 532 is defined as a CLR2 signal. Also, the GSP signal supplied to the gate drive circuit 531 is defined as a GSP1 signal. The GSP signal supplied to the gate drive circuit 532 is defined as a GSP2 signal. The active matrix substrate 501a includes a signal line 551a that transmits the CLR1 signal to the gate drive circuit 531, a signal line 551a that transmits the GSP1 signal to the gate drive circuit 531, a signal line 551b that transmits the CLR2 signal to the gate drive circuit 531, and a signal line 551b that transmits the GSP2 signal to the gate drive circuit 531. Also, the active matrix substrate 501a includes an inspection terminal 544a disposed on the signal line 551a that transmits the GSP1 signal to the gate drive circuit 531 and an inspection terminal 545a disposed on the signal line 551a that transmits the CLR1 signal to the gate drive circuit 531. Also, the active matrix substrate 501a includes an inspection terminal 544b disposed on the signal line 551b that transmits the GSP2 signal to the gate drive circuit 532 and an inspection terminal 545b disposed on the signal line 551b that transmits the CLR2 signal to the gate drive circuit 532. According to this configuration, inspection can be performed even on the active matrix substrate 501a that performs interlaced drive. Also, the inspection terminal 342a supplied with the VDD signal and the inspection terminal 342b supplied with the VSS signal are disposed on only one of the signal line connected to the gate drive circuit 531 and the signal line connected to the gate drive circuit 532. Thus, compared to a configuration in which they are disposed on both, the number of inspection terminals can be reduced. Other configurations and effects are the same as or similar to those in the first embodiment or the second embodiment.

Fourth Embodiment

Figure 16:
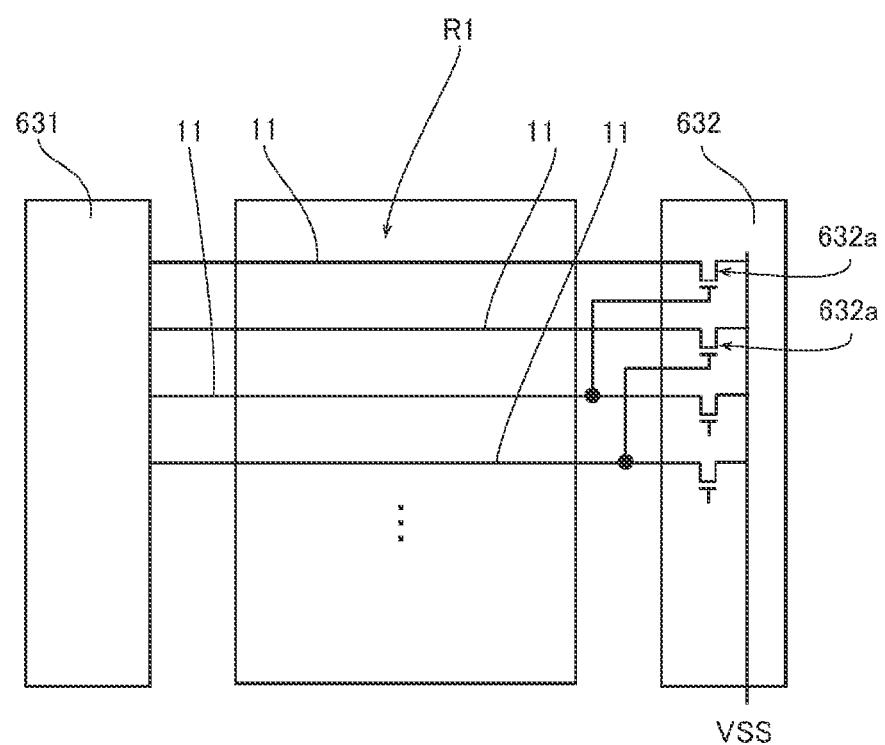
FIG. 16 is a schematic view for describing the configuration of a gate drive circuit 632 according to the fourth embodiment.

Next, the configuration of an active matrix substrate 601a according to a fourth embodiment will be described with reference to FIGS. 15 and 16. Note that constituents that are the same as those in any one of the first to third embodiments are denoted by the same reference signs, and description thereof will be omitted. FIG. 15 is a schematic view illustrating the configuration of the active matrix substrate 601a according to the fourth embodiment. FIG. 16 is a schematic view for describing the configuration of a gate drive circuit 632 according to the fourth embodiment.

As illustrated in FIG. 15, the active matrix substrate 601a according to the fourth embodiment includes the gate drive circuit 632. As illustrated in FIG. 16, the gate drive circuit 632 is provided with transistors 632a that are connected to the gate lines 11 and are for executing reset processing to make the potential of the gate lines 11 the same potential as the VSS signal. More specifically, the VSS signal is supplied to the source of the transistors 632a. The gate line 11 is connected to the drain of the transistor 632a, and the gate line 11 located two lines below the gate line 11 connected to the drain of the transistor 632a is connected to the gate of the transistor 632a. Due to the arrangement of the transistor 632a, the transition time of the gate line 11 from High potential to Low potential can be shortened. Also, control signals other than the VSS signal are not supplied to the gate drive circuit 632.

As illustrated in FIG. 15, inspection terminals 642b are disposed in a region on the X1 direction side as seen from the pixel region R1. The active matrix substrate 601a is provided with connection lines 653 connecting the signal line 51 that transmits the VSS signal to a gate drive circuit 631, the signal line 51 that transmits the GSP signal, the signal line 51 that transmits the CK1 signal, and the signal line 51 that transmits the CK3 signal and the plurality of inspection terminals 642b. The plurality of connection lines 653 each include a portion that is disposed in a region on the Y1 direction side as seen from the pixel region R1 and are connected to the inspection terminals 642b via a region on the X1 direction side as seen from the pixel region R1. Accordingly, the inspection terminals 42a and 642b can be disposed separately on the active matrix substrate 601a, allowing crowding of the inspection terminals near the gate drive circuit 631 to be prevented. Other configurations and effects are the same as or similar to those in the first embodiment.

Modified Example of Fourth Embodiment

Figure 17:
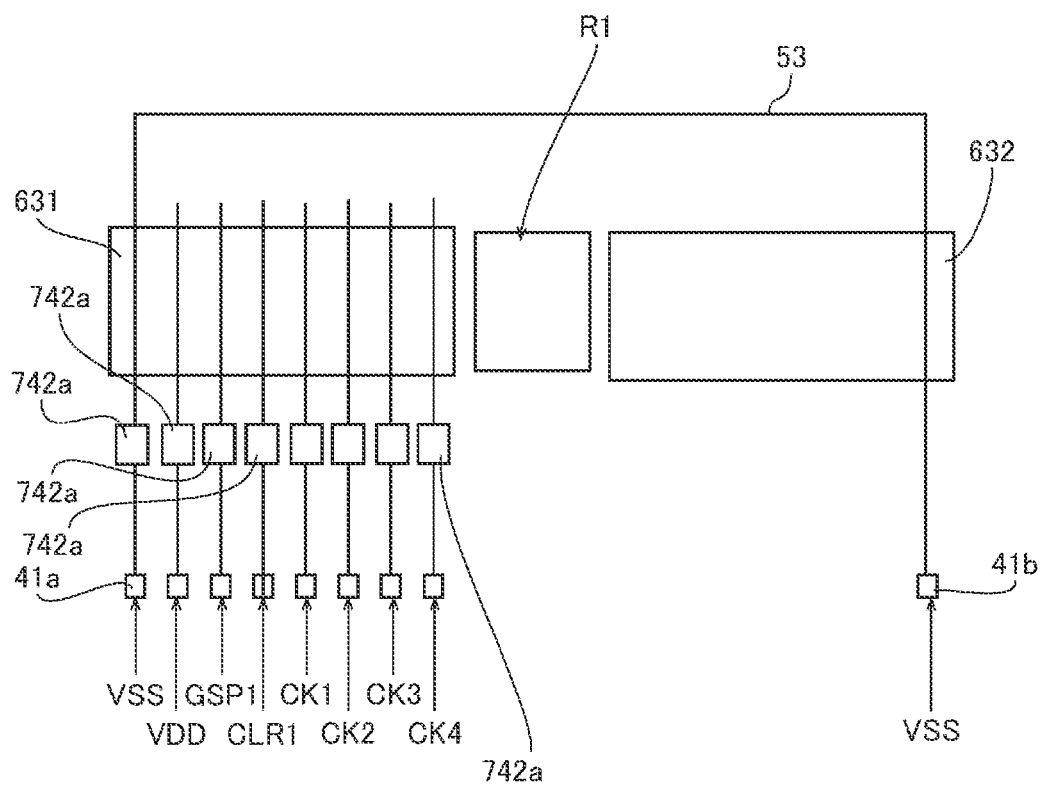
FIG. 17 is a schematic view illustrating the configuration of an active matrix substrate 701a according to a modified example of the fourth embodiment.

Next, the configuration of an active matrix substrate 701a according to a modified example of the fourth embodiment will be described with reference to FIG. 17. Note that constituents that are the same as those in any one of the first to fourth embodiments are denoted by the same reference signs, and description thereof will be omitted. FIG. 17 is a schematic view illustrating the configuration of the active matrix substrate 701a according to the modified example of the fourth embodiment. As illustrated in FIG. 17, in the active matrix substrate 701a, all inspection terminals 742a are disposed in a region on the X2 direction side as seen from the pixel region R1. Also, no inspection terminal is disposed on the signal line that is connected to the gate drive circuit 632 and supplies the VSS signal, and an inspection terminal is disposed on the signal line that is connected to the gate drive circuit 631 and supplies the VSS signal. More specifically, the VSS inspection terminal that supplies the VSS signal to the gate drive circuit 632 is disposed in a region closer to the gate drive circuit 631 than to the gate drive circuit 632 which is a region on the X2 direction side as seen from the pixel region R1 and not disposed in a region closer to the gate drive circuit 632 than to the gate drive circuit 631 which is a region on the X1 direction side as seen from the pixel region R1. Accordingly, it is possible to reduce the number of inspection terminals disposed on the signal lines that supply the VSS signal.

Fifth Embodiment

Figure 18:
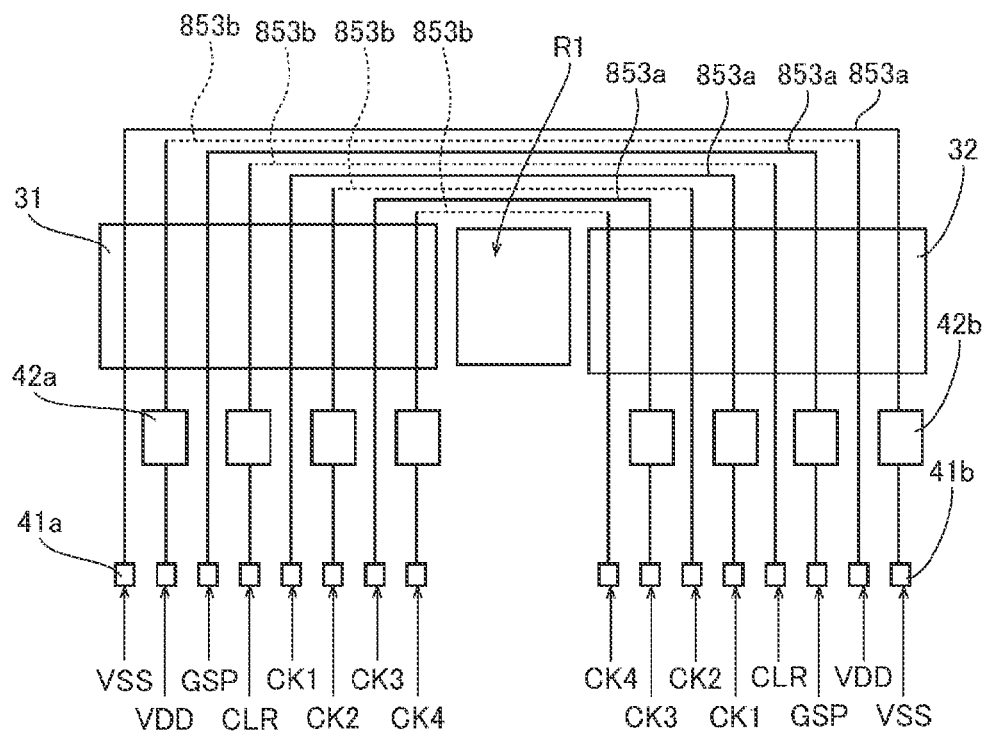
FIG. 18 is a schematic view illustrating the configuration of an active matrix substrate 801a according to a fifth embodiment.
Figure 19:
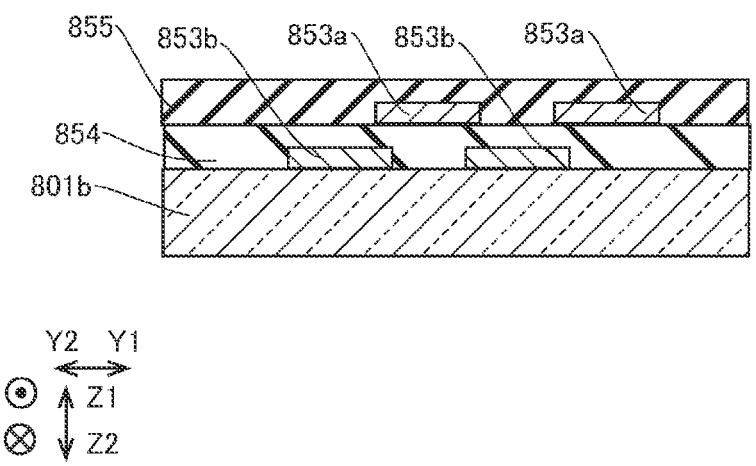
FIG. 19 is a cross-sectional view illustrating a portion of the active matrix substrate 801a where connection lines 853a and 853b are disposed according to the fifth embodiment.

Next, the configuration of an active matrix substrate 801a according to a fifth embodiment will be described with reference to FIGS. 18 and 19. Note that constituents that are the same as those in any one of the first to fourth embodiments are denoted by the same reference signs, and description thereof will be omitted. FIG. 18 is a schematic view illustrating the configuration of the active matrix substrate 801a according to the fifth embodiment. FIG. 19 is a cross-sectional view illustrating a portion of the active matrix substrate 801a where connection lines 853a and 853b are disposed according to the fifth embodiment.

As illustrated in FIG. 18, the active matrix substrate 801a according to the fifth embodiment includes the connection lines 853a and 853b. The connection lines 853a and the connection lines 853b are disposed adjacent to one another in a plan view. For example, the connection lines 853a and the connection lines 853b are alternately arranged in the Y2 direction in a region of the frame region R2 on the Y1 direction side as seen from the pixel region R1. As illustrated in FIG. 19, the layer where the connection lines 853a are formed is different from the layer where the connection lines 853b are formed. For example, the connection lines 853b are formed on a substrate 801b, and an insulating film 854 is formed covering the connection lines 853b. Also, the connection lines 853a are formed on the insulating film 854, and an insulating film 855 is formed covering the connection lines 853a. For example, the layer where the connection lines 853a are formed is the same as the layer where the source lines 12 are formed. The layer where the connection lines 853b are formed is the same as the layer where the gate lines 11 are formed. Accordingly, even when the connection lines 853a are disposed overlapping the connection line 853b in a plan view, the connection lines 853a and the connection line 853b are not electrically connected. According to the active matrix substrate 801a of the fifth embodiment, the frame region R2 can be reduced in size.

Sixth Embodiment

Figure 20:
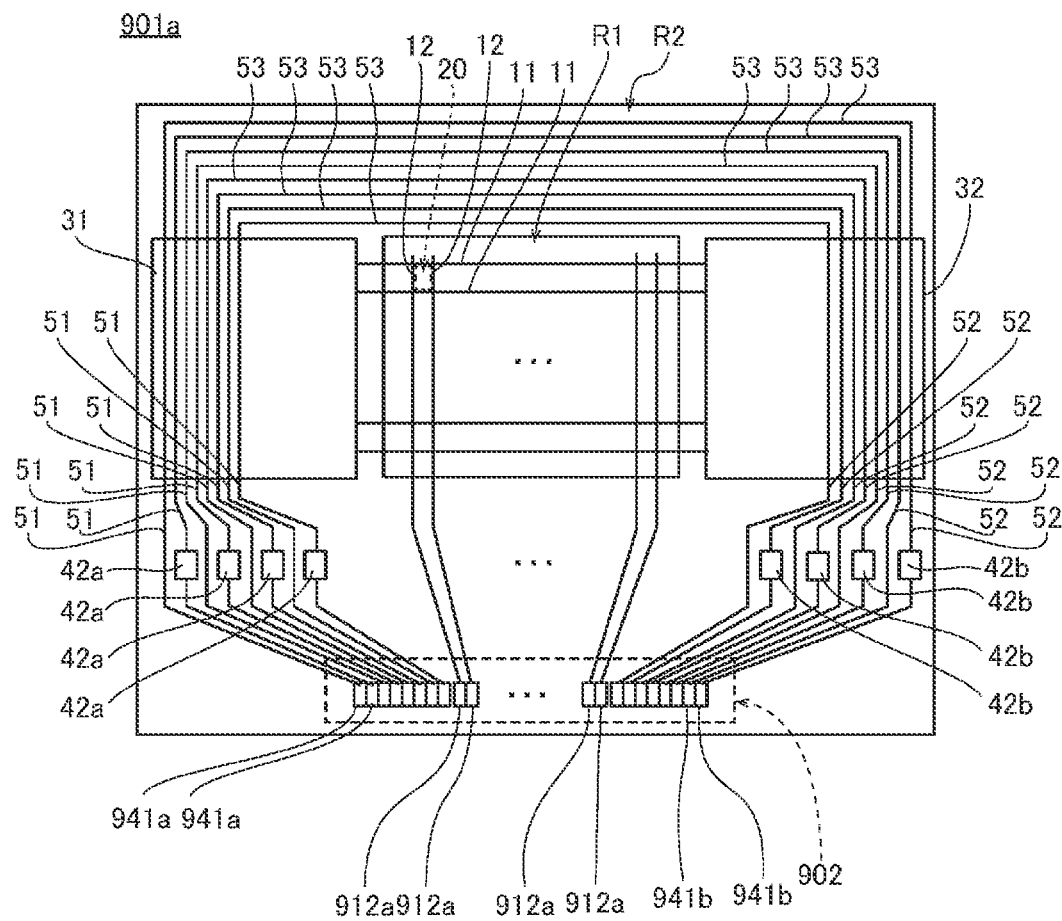
FIG. 20 is a schematic view illustrating the configuration of an active matrix substrate 901a according to a sixth embodiment.

Next, the configuration of an active matrix substrate 901a according to a sixth embodiment will be described with reference to FIG. 20. Note that constituents that are the same as those in any one of the first to fifth embodiments are denoted by the same reference signs, and description thereof will be omitted. FIG. 20 is a schematic view illustrating the configuration of the active matrix substrate 901a according to the sixth embodiment.

As illustrated in FIG. 20, the active matrix substrate 901a according to the sixth embodiment includes gate terminals 941a and 941b and source terminals 912a. The gate terminals 941a and 941b and the source terminals 912a are configured to be mountable with a control circuit element 902. For example, the gate terminals 941a and 941b and the source terminals 912a are configured so that the intervals (pitch) of the gate terminals 941a and 941b and the source terminals 912a match the intervals (pitch) of the plurality of terminals of the control circuit element 902. In other words, the gate terminals 941a and 941b and the source terminals 912a have a structure corresponding to chip on glass (COG)

technology. According to this example, the active matrix substrate 901a corresponding to COG technology can be provided.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

(1) In the first to sixth embodiments described above, the inspection terminals are disposed on the signal lines. However, the disclosure is not limited to this example. For example, the inspection terminals may be disposed on the connection lines, not on the signal lines. In this case, the counter substrate may be disposed not opposite to the inspection terminal disposed on the connection line.

(2) In the first to sixth embodiments described above, the connection lines are disposed in a region on the Y1 direction side as seen from the pixel region. However, the disclosure is not limited to this example. For example, the connection lines may be disposed in a region on the Y2 direction side as seen from the pixel region. In this case, a plurality of insulating films may be disposed between the connection lines and other wiring lines so that the capacity at the intersection portion of the connection lines and the other wiring lines that meet the connection lines is not increased. Also, the plurality of insulating films may include an organic insulating film with a lower dielectric constant than an inorganic insulating film such as a silicon oxide film or a silicon nitride film.

(3) In the first to sixth embodiments described above, the inspection terminals are disposed in a region on the Y2 direction side as seen from the pixel region. However, the disclosure is not limited to this example. For example, the inspection terminals may be disposed in a region on the Y1 direction side as seen from the pixel region. In this case, the counter substrate may be disposed not opposite to the inspection terminal.

(4) The inspection terminals according to the first to sixth embodiments can be used in manufacturing a display panel using polymer sustained alignment (PSA) technology. The PSA technology includes forming an alignment sustaining layer that gives a pretilt to liquid crystal molecules contained in a liquid crystal layer when no voltage is applied. The alignment sustaining layer is formed by photopolymerizing a photopolymerizable monomer mixed in advance in the liquid crystal layer while applying a voltage to the liquid crystal layer. Via the alignment sustaining layer, the liquid crystal molecules when no voltage is applied are sustained at a pretilt angle tilted by, for example, 2° to 3° from the normal direction of the substrate surface and the orientation direction. When a voltage is applied to the liquid crystal layer to cause photopolymerization, an on potential may be supplied to all the gate lines. However, at this time, a signal may be input from the inspection terminal to operate the gate drive circuit. Note that in the case of a display panel using PSA technology, liquid crystal having negative anisotropy of dielectric constant is used for the liquid crystal layer, and the counter electrode is formed on the counter substrate.

(5) The display panel may be an in-plane switching (IPS) mode or a fringe field switching (FFS) mode. In these cases, liquid crystal having positive or negative anisotropy of dielectric constant is used for the liquid crystal layer, and the counter electrode is formed on the active matrix substrate.

(6) The planar shape of the display panel may be rectangular with vertical elongation, square, circular, semi-circular, elliptical, oval, trapezoidal, or the like. Also, a shape with a narrow region on the Y2 direction side as seen from the pixel region (for example, a shape with a rectangular outline but rounded corners) may be used.

(7) The display panel may be a transmissive type or may be a reflective type or a transflective type.

(8) The display panel may be a display panel of a type other than a liquid crystal display panel including a liquid crystal layer. For example, an organic electro luminescence (EL) display panel or a microcapsule-type electrophoretic display (EPD) panel may be used.

The active matrix substrate and the display device described above can be described as follows.

An active matrix substrate according to a first configuration includes: a substrate; a plurality of thin film transistors formed in a pixel region of the substrate; a gate line group including a plurality of gate lines respectively connected to the plurality of thin film transistors; a first gate drive circuit configured to supply a gate signal to the gate line group from a first direction; a second gate drive circuit configured to supply a gate signal to the gate line group from a second direction opposite the first direction; a first control signal line connected to the first gate drive circuit; a second control signal line connected to the second gate drive circuit; a first gate terminal connected to the first control signal line, the first gate terminal configured to supply a control signal to the first control signal line; a second gate terminal connected to the second control signal line, the second gate terminal configured to supply a control signal to the second control signal line; a first connection line configured to connect the first control signal line and the second control signal line; and a first input terminal disposed on one of the first control signal line, the second control signal line, and the first connection line (first configuration).

According to the first configuration, a control signal is supplied from the first gate terminal to the first gate drive circuit, and a control signal is supplied from the second gate terminal to the second gate drive circuit. Accordingly, unlike when the control signals pass through the wiring line formed running between the first gate drive circuit and the second gate drive circuit from one to the other, the control signals supplied to the first gate drive circuit and the second gate drive circuit are unlikely to have a blunted waveform. As a result, the thin film transistor can be operated at the appropriate timing, allowing the display quality to be improved. Also, since the first input terminal is disposed on one of the first control signal line, the second control signal line, and the first connection line, a signal input from the first input terminal is supplied to both the first gate drive circuit and the second gate drive circuit. Accordingly, the number of terminals can be made less compared to a configuration without the first connection line in which the first input terminal is provided for each of the first control signal line and the second control signal line.

In the first configuration, the first connection line may be disposed in a region in a third direction orthogonal to the first direction with respect to the first gate drive circuit and the second gate drive circuit. Also, the first input terminal may be disposed in a region in a fourth direction opposite the third direction with respect to the first gate drive circuit and the second gate drive circuit (second configuration).

According to the second configuration, the first connection line and the first input terminal can be disposed separated in the third direction and the fourth direction with respect to the first gate drive circuit and the second gate drive circuit.

In the second configuration, the active matrix substrate may further include: a third control signal line connected to the first gate drive circuit; a fourth control signal line connected to the second gate drive circuit; a third gate terminal connected to the third control signal line, the third gate terminal configured to supply a control signal to the third control signal line; a fourth gate terminal connected to the fourth control signal line, the fourth gate terminal configured to supply a control signal to the fourth control signal line; a second connection line configured to connect the third control signal line and the fourth control signal line; and a second input terminal disposed on the fourth control signal line. The first input terminal may be disposed on the first control signal line. The second input terminal may be disposed on the fourth control signal line in a region in the second direction as seen from the first input terminal, the region being closer to the second gate drive circuit than to the first gate drive circuit (third configuration).

According to the third configuration, even when a plurality of input terminals (the first input terminal and the second input terminal) are provided, the plurality of input terminals can be disposed separated in the extending direction of the gate lines (the first direction or the second direction).

In the third configuration, the active matrix substrate may further include a first control signal line group including a plurality of first control signal lines or the first control signal line may be solitarily provided. The active matrix substrate may further include a second control signal line group including a plurality of second control signal lines or the second control signal line may be solitarily provided. The active matrix substrate may further include a third control signal line group including a plurality of third control signal lines or the third control signal line may be solitarily provided. The active matrix substrate may further include a fourth control signal line group including a plurality of fourth control signal lines or the fourth control signal line may be solitarily provided. The active matrix substrate may further include a first input terminal group including a plurality of first input terminals or the first input terminal may be solitarily provided. The active matrix substrate may further include a second input terminal group including a plurality of second input terminals or the second input terminal may be solitarily provided. The active matrix substrate may further include a first connection line group including a plurality of first connection lines or the first connection line may be solitarily provided. The active matrix substrate may further include a second connection line group including a plurality of second connection lines or the second connection line may be solitarily provided. The first input terminals may amount to less than a total number of the plurality of first control signal lines or the first control signal line and the plurality of second control signal lines or the second control signal line, and the second input terminals may amount to less than a total number of the plurality of third control signal lines or the third control signal line and the plurality of fourth control signal lines or the fourth control signal line (fourth configuration).

According to the fourth configuration, the number of the first input terminals and the number of the second input terminals can be reduced.

In any one of the second to fourth configurations, the active matrix substrate may further include: a third control signal line connected to the first gate drive circuit; a fourth control signal line connected to the second gate drive circuit; a third gate terminal connected to the third control signal line, the third gate terminal configured to supply a control signal to the third control signal line; a fourth gate terminal connected to the fourth control signal line, the fourth gate terminal configured to supply a control signal to the fourth control signal line; a second connection line configured to connect the third control signal line and the fourth control signal line; and a second input terminal disposed on the fourth control signal line. The second connection line may be formed in a different layer to a layer where the first connection line is formed (fifth configuration).

According to the fifth configuration, since the second connection line and the first connection line can be disposed overlapping one another in a plan view, it is possible to reduce the width of a region (for example, a frame region) in which the second connection line and the first connection line are disposed.

In any one of the first to fifth configurations, the first input terminal may be an inspection terminal configured to be input with an inspection signal (sixth configuration).

According to the sixth configuration, the inspection terminal is used only at the time of inspection, and after the product is completed and shipped, when the user visually recognizes the display, the inspection terminal is not used and thus do not affect the display quality.

In any one of the first to sixth configurations, an area of the first input terminal may be two times or more of an area of the first gate terminal or two times or more of an area of the second gate terminal (seventh configuration).

According to the seventh configuration, when an electrode, a terminal, or the like is brought into contact with the first input terminal from the outside, contact can be easily made because the area is large.

In any one of the first to seventh configurations, a gate signal may be supplied from both the first gate drive circuit and the second gate drive circuit to one gate line from among the plurality of gate lines (eighth configuration).

According to the eighth configuration, even when the size of the active matrix substrate is increased, the gate signal can be prevented from being blunted. This allows the display quality to be improved in a large-sized display device.

In any one of the first to seventh configurations, the plurality of gate lines may include a first gate line and a second gate line. The first gate line may be supplied with a gate signal from the first gate drive circuit. The second gate line may be supplied with a gate signal from the second gate drive circuit. The first gate line and the second gate line may be alternately arranged in a third direction orthogonal to the first direction (ninth configuration).

According to the ninth configuration, even in an active matrix substrate that performs interlaced drive, the display quality can be improved and the number of terminals can be reduced.

In any one of the first to ninth configurations, the active matrix substrate may further include: a first clock signal line connected to the first gate drive circuit; a first clock terminal connected to the first clock signal line, the first clock terminal configured to supply a clock signal to the first clock signal line; a third connection line connected to the first clock signal line; and a first clock input terminal connected to the third connection line. The third connection line may be at least partially disposed in a region in the second direction and a region in a third direction orthogonal to the first direction as seen from the pixel region. The first clock input terminal may be disposed in a region in a fourth direction opposite the third direction with respect to the second gate drive circuit, the region being closer to the second gate drive circuit than to the first gate drive circuit. The first clock signal line may not be connected to the second gate drive circuit (tenth configuration).

According to the tenth configuration, since the first clock input terminal is disposed in a region closer to the second gate drive circuit to which the first clock signal line is not connected, the first clock terminal and the first clock input terminal can be disposed separated in the first direction and the second direction.

In any one of the first to tenth configurations, the active matrix substrate may further include: a first clock signal line connected to the first gate drive circuit; a second clock signal line connected to the second gate drive circuit; a first clock terminal connected to the first clock signal line, the first clock terminal configured to supply a clock signal to the first clock signal line; a second clock terminal connected to the second clock signal line, the second clock terminal configured to supply a clock signal to the second clock signal line; a first clock input terminal connected to the first clock signal line; and a second clock input terminal connected to the second clock signal line. The first input terminal may be disposed on one of the first control signal line different from the first clock signal line and a second control signal line different from the second clock signal line (eleventh configuration).

Here, when the input terminal supplied with the clock signal at the time of inspection and the drive circuit to be inspected from among the first gate drive circuit and the second gate drive circuit are disposed distanced from one another, the waveform of the clock signal is blunted, the gate drive circuits do not operate as desired, and an erroneous inspection result may be obtained. However, according to the eleventh configuration, at the time of inspection, the first clock input terminal and the second clock input terminal that can supply a clock signal to the first gate drive circuit and the second gate drive circuit are provided on the active matrix substrate. Accordingly, at the time of inspection, the waveform of the clock signal is prevented from being blunted. This prevents an erroneous inspection result from being obtained. Also, since the first input terminal is connected to one of the first control signal line different from the first clock signal line and a second control signal line different from the second clock signal line, an increase in the number of input terminals can be suppressed.

In the eleventh configuration, the first clock input terminal may be disposed in a region in the first direction as seen from the second clock input terminal, the region being closer to the first gate drive circuit than to the second gate drive circuit. The second clock input terminal may be disposed in a region in the second direction as seen from the first clock input terminal, the region being closer to the second gate drive circuit than to the first gate drive circuit (twelfth configuration). Also, in the twelfth configuration, the clock signal supplied to the first clock terminal and the clock signal supplied to the second clock terminal may be an identical signal (thirteenth configuration).

According to the twelfth and thirteenth configurations, the first clock input terminal and the second clock input terminal can be disposed separated in a region in the first direction and a region in the second direction.

In the eleventh configuration, the first control signal line may include a first constant voltage line. The second control signal line may include a second constant voltage line. The first gate terminal may include a first constant voltage terminal connected to the first constant voltage line, the first constant voltage terminal configured to supply voltage with a constant voltage value to the first constant voltage line. The second gate terminal may include a second constant voltage terminal connected to the second constant voltage line, the second constant voltage terminal configured to supply voltage with a constant voltage value to the second constant voltage line. The first input terminal may be disposed on one of the first constant voltage line and the second constant voltage line (fourteenth configuration).

Here, a voltage with a constant voltage value is supplied to the first constant voltage line and the second constant voltage line. Accordingly, unlike the clock signal which is repeatedly supplied during the period in which the entire screen is scanned, the waveforms of the voltages transmitted on the first constant voltage line and the second constant voltage line hardly fluctuate even if the signal transmission path is long. Thus, even when the first input terminal is provided on only one of the first constant voltage line and the second constant voltage line and inspection is performed by driving both the first gate drive circuit and the second gate drive circuit, there is almost no difference in waveform between a signal input from the first input terminal to the first gate drive circuit and a signal input from the first input terminal to the second gate drive circuit. In this case, the influence on the inspection is small. Regarding this, according to the fourteenth configuration, since the first input terminal is disposed on one of the first constant voltage line or the second constant voltage line, the number of terminals for inspection can be reduced while preventing influence on the inspection. Also, even when one of the first gate drive circuit and the second gate drive circuit is faulty and the other is not faulty, an inspection in which both the first gate drive circuit and the second gate drive circuit are driven may result in an erroneous determination that the first gate drive circuit and the second gate drive circuit are not faulty. Thus, after an inspection in which one of the first gate drive circuit and the second gate drive circuit is driven, an inspection may be performed in which the other is driven. Here, since a voltage with a constant voltage value is applied at the first constant voltage line and the second constant voltage line during a period in which either the first gate drive circuit or the second gate drive circuit is driven, the waveform does not fluctuate. Thus, according to the fourteenth configuration, even when the first input terminal is used as the inspection terminal, the number of terminals can be reduced while preventing an erroneous inspection result from being obtained.

In the eleventh configuration, the first control signal line may include a first gate start pulse signal line. The second control signal line may include a second gate start pulse signal line. The first gate terminal may include a first gate start pulse terminal connected to the first gate start pulse signal line, the first gate start pulse terminal configured to supply a gate start pulse signal to the first gate start pulse signal line. The second gate terminal may include a second gate start pulse terminal connected to the second gate start pulse signal line, the second gate start pulse terminal configured to supply a gate start pulse signal to the second gate start pulse signal line. The first input terminal may be disposed on one of the first gate start pulse signal line and the second gate start pulse signal line (fifteenth configuration).

Here, the first control signal line is connected to a unit circuit corresponding to the first output or the first several outputs in a period in which the entire screen is scanned from among the plurality of unit circuits provided in the first gate drive circuit. Also, the second control signal line is connected to a unit circuit corresponding to the first output or the first several outputs in a period in which the entire screen is scanned from among the plurality of unit circuits provided in the second gate drive circuit. The gate start pulse signal is supplied to the first gate start pulse signal line and the second gate start pulse signal line only at the beginning of the period in which the entire screen is scanned. Accordingly, the influence from the blunted waveform of the gate start pulse signal on the inspection is less than in the case of a clock signal which is repeatedly supplied during the period in which the entire screen is scanned. Thus, according to the fifteenth configuration, when the first input terminal is used as the inspection terminal, the number of terminals for inspection can be reduced while preventing influence on the inspection.

In the eleventh configuration, the first control signal line may include a first clear signal line. The second control signal line may include a second clear signal line. The first gate terminal may include a first clear terminal connected to the first clear signal line, the first clear terminal configured to supply a clear signal to the first clear signal line. The second gate terminal may include a second clear terminal connected to the second clear signal line, the second clear terminal configured to supply a clear signal to the second clear signal line. The first input terminal may be disposed on one of the first clear signal line and the second clear signal line (sixteenth configuration).

Here, the first control signal line is connected to a unit circuit corresponding to the last output or the last several outputs in a period in which the entire screen is scanned from among the plurality of unit circuits provided in the first gate drive circuit. Also, the second control signal line is connected to a unit circuit corresponding to the last output or the last several outputs in a period in which the entire screen is scanned from among the plurality of unit circuits provided in the second gate drive circuit. The clear signal is supplied to the first clear signal line and the second clear signal line only at the end of the period in which the entire screen is scanned. Accordingly, the influence from the blunted waveform of the clear signal on the inspection is less than in the case of a clock signal which is repeatedly supplied during the period in which the entire screen is scanned. Thus, according to the sixteenth configuration, when the first input terminal is used as the inspection terminal, the number of terminals for inspection can be reduced while preventing influence on the inspection.

In any one of the first to sixteenth configurations, the first gate terminal and the second gate terminal may be configured to be mountable with an integrated circuit (seventeenth configuration).

According to the seventeenth configuration, an integrated circuit can be directly mounted on the first gate terminal and the second gate terminal.

A display device according to an eighteenth configuration includes: a substrate; a plurality of thin film transistors formed in a pixel region of the substrate; a gate line group including a plurality of gate lines respectively connected to the plurality of thin film transistors; a first gate drive circuit configured to supply a gate signal to the gate line group from a first direction; a second gate drive circuit configured to supply a gate signal to the gate line group from a second direction opposite the first direction; a first control signal line connected to the first gate drive circuit; a second control signal line connected to the second gate drive circuit; a first gate terminal connected to the first control signal line, the first gate terminal configured to supply a control signal to the first control signal line; a second gate terminal connected to the second control signal line, the second gate terminal configured to supply a control signal to the second control signal line; a first connection line configured to connect the first control signal line and the second control signal line; a first input terminal disposed on one of the first control signal line, the second control signal line, and the first connection line; and a counter substrate disposed opposite the substrate (eighteenth configuration).

According to the eighteenth configuration, a display device can be provided that can improve display quality and reduce the number of terminals disposed on a substrate.

In the eighteenth configuration, the first input terminal may be disposed in a region of the substrate, the region being not opposite the counter substrate (nineteenth configuration).

According to the nineteenth configuration, when a signal is input to the first input terminal, an electrode or the like can be brought into contact with the first input terminal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. An active matrix substrate comprising:
   a substrate;
   a plurality of thin film transistors formed in a pixel region of the substrate;
   a gate line group including a plurality of gate lines respectively connected to the plurality of thin film transistors;
   a first gate drive circuit configured to supply a gate signal to the gate line group from a first direction;
   a second gate drive circuit configured to supply a gate signal to the gate line group from a second direction opposite the first direction;
   a first control signal line connected to the first gate drive circuit;
   a second control signal line connected to the second gate drive circuit;
   a first gate terminal connected to the first control signal line, the first gate terminal configured to supply a control signal to the first control signal line;
   a second gate terminal connected to the second control signal line, the second gate terminal configured to supply a control signal to the second control signal line;
   a first connection line configured to connect the first control signal line and the second control signal line; and
   a first input terminal disposed on one of the first control signal line, the second control signal line, and the first connection line.
2. The active matrix substrate according to claim 1,
   wherein the first connection line is disposed in a region in a third direction orthogonal to the first direction with respect to the first gate drive circuit and the second gate drive circuit, and
   the first input terminal is disposed in a region in a fourth direction opposite the third direction with respect to the first gate drive circuit and the second gate drive circuit.
3. The active matrix substrate according to claim 2, further comprising:
   a third control signal line connected to the first gate drive circuit;
   a fourth control signal line connected to the second gate drive circuit;
   a third gate terminal connected to the third control signal line, the third gate terminal configured to supply a control signal to the third control signal line;

a fourth gate terminal connected to the fourth control signal line, the fourth gate terminal configured to supply a control signal to the fourth control signal line;
a second connection line configured to connect the third control signal line and the fourth control signal line; and
a second input terminal disposed on the fourth control signal line,
wherein the first input terminal is disposed on the first control signal line, and
the second input terminal is disposed on the fourth control signal line in a region in the second direction as seen from the first input terminal, the region being closer to the second gate drive circuit than to the first gate drive circuit.

4. The active matrix substrate according to claim 3, wherein a first control signal line group including a plurality of first control signal lines is further provided or the first control signal line is solitarily provided,
a second control signal line group including a plurality of second control signal lines is further provided or the second control signal line is solitarily provided,
a third control signal line group including a plurality of third control signal lines is further provided or the third control signal line is solitarily provided,
a fourth control signal line group including a plurality of fourth control signal lines is further provided or the fourth control signal line is solitarily provided,
a first input terminal group including a plurality of first input terminals is further provided or the first input terminal is solitarily provided,
a second input terminal group including a plurality of second input terminals is further provided or the second input terminal is solitarily provided,
a first connection line group including a plurality of first connection lines is further provided or the first connection line is solitarily provided,
a second connection line group including a plurality of second connection lines is further provided or the second connection line is solitarily provided,
the first input terminals amount to less than a total number of the plurality of first control signal lines or the first control signal line and the plurality of second control signal lines or the second control signal line, and
the second input terminals amount to less than a total number of the plurality of third control signal lines or the third control signal line and the plurality of fourth control signal lines or the fourth control signal line.

5. The active matrix substrate according to claim 2, further comprising:
a third control signal line connected to the first gate drive circuit;
a fourth control signal line connected to the second gate drive circuit;
a third gate terminal connected to the third control signal line, the third gate terminal configured to supply a control signal to the third control signal line;
a fourth gate terminal connected to the fourth control signal line, the fourth gate terminal configured to supply a control signal to the fourth control signal line;
a second connection line configured to connect the third control signal line and the fourth control signal line; and
a second input terminal disposed on the fourth control signal line,
wherein the second connection line is formed in a different layer to a layer where the first connection line is formed.

6. The active matrix substrate according to claim 1, wherein the first input terminal is an inspection terminal configured to be input with an inspection signal.

7. The active matrix substrate according to claim 1, wherein an area of the first input terminal is two times or more of an area of the first gate terminal or two times or more of an area of the second gate terminal.

8. The active matrix substrate according to claim 1, wherein a gate signal is supplied from both the first gate drive circuit and the second gate drive circuit to one gate line from among the plurality of gate lines.

9. The active matrix substrate according to claim 1, wherein the plurality of gate lines includes a first gate line and a second gate line,
the first gate line is supplied with a gate signal from the first gate drive circuit,
the second gate line is supplied with a gate signal from the second gate drive circuit, and
the first gate line and the second gate line are alternately arranged in a third direction orthogonal to the first direction.

10. The active matrix substrate according to claim 1, further comprising:
a first clock signal line connected to the first gate drive circuit;
a first clock terminal connected to the first clock signal line, the first clock terminal configured to supply a clock signal to the first clock signal line;
a third connection line connected to the first clock signal line; and
a first clock input terminal connected to the third connection line,
wherein the third connection line is at least partially disposed in a region in the second direction and a region in a third direction orthogonal to the first direction as seen from the pixel region,
the first clock input terminal is disposed in a region in a fourth direction opposite the third direction with respect to the second gate drive circuit, the region being closer to the second gate drive circuit than to the first gate drive circuit, and
the first clock signal line is not connected to the second gate drive circuit.

11. The active matrix substrate according to claim 1, further comprising:
a first clock signal line connected to the first gate drive circuit;
a second clock signal line connected to the second gate drive circuit;
a first clock terminal connected to the first clock signal line, the first clock terminal configured to supply a clock signal to the first clock signal line;
a second clock terminal connected to the second clock signal line, the second clock terminal configured to supply a clock signal to the second clock signal line;
a first clock input terminal connected to the first clock signal line; and
a second clock input terminal connected to the second clock signal line,
wherein the first input terminal is disposed on one of the first control signal line different from the first clock signal line and the second control signal line different from the second clock signal line.

12. The active matrix substrate according to claim 11,
wherein the first clock input terminal is disposed in a region in the first direction as seen from the second clock input terminal, the region being closer to the first gate drive circuit than to the second gate drive circuit, and the second clock input terminal is disposed in a region in the second direction as seen from the first clock input terminal, the region being closer to the second gate drive circuit than to the first gate drive circuit.

13. The active matrix substrate according to claim 12,
wherein the clock signal supplied to the first clock terminal and the clock signal supplied to the second clock terminal are an identical signal.

14. The active matrix substrate according to claim 11,
wherein the first control signal line includes a first constant voltage line, the second control signal line includes a second constant voltage line, the first gate terminal includes a first constant voltage terminal connected to the first constant voltage line, the first constant voltage terminal configured to supply voltage with a constant voltage value to the first constant voltage line, the second gate terminal includes a second constant voltage terminal connected to the second constant voltage line, the second constant voltage terminal configured to supply voltage with a constant voltage value to the second constant voltage line, and the first input terminal is disposed on one of the first constant voltage line and the second constant voltage line.

15. The active matrix substrate according to claim 11,
wherein the first control signal line includes a first gate start pulse signal line, the second control signal line includes a second gate start pulse signal line, the first gate terminal includes a first gate start pulse terminal connected to the first gate start pulse signal line, the first gate start pulse terminal configured to supply a gate start pulse signal to the first gate start pulse signal line, the second gate terminal includes a second gate start pulse terminal connected to the second gate start pulse signal line, the second gate start pulse terminal configured to supply a gate start pulse signal to the second gate start pulse signal line, and the first input terminal is disposed on one of the first gate start pulse signal line and the second gate start pulse signal line.

16. The active matrix substrate according to claim 11,
wherein the first control signal line includes a first clear signal line, the second control signal line includes a second clear signal line, the first gate terminal includes a first clear terminal connected to the first clear signal line, the first clear terminal configured to supply a clear signal to the first clear signal line, the second gate terminal includes a second clear terminal connected to the second clear signal line, the second clear terminal configured to supply a clear signal to the second clear signal line, and the first input terminal is disposed on one of the first clear signal line and the second clear signal line.

17. The active matrix substrate according to claim 1,
wherein the first gate terminal and the second gate terminal are configured to be mountable with an integrated circuit.

18. A display device comprising:
a substrate;
a plurality of thin film transistors formed in a pixel region of the substrate;
a gate line group including a plurality of gate lines respectively connected to the plurality of thin film transistors;
a first gate drive circuit configured to supply a gate signal to the gate line group from a first direction;
a second gate drive circuit configured to supply a gate signal to the gate line group from a second direction opposite the first direction;
a first control signal line connected to the first gate drive circuit;
a second control signal line connected to the second gate drive circuit;
a first gate terminal connected to the first control signal line, the first gate terminal configured to supply a control signal to the first control signal line;
a second gate terminal connected to the second control signal line, the second gate terminal configured to supply a control signal to the second control signal line;
a first connection line configured to connect the first control signal line and the second control signal line;
a first input terminal disposed on one of the first control signal line, the second control signal line, and the first connection line; and
a counter substrate disposed opposite the substrate.

19. The display device according to claim 18,
wherein the first input terminal is disposed in a region of the substrate, the region being not opposite the counter substrate.

* * * * *